(12) United States Patent
Futakuchi et al.

(10) Patent No.: US 9,960,729 B2
(45) Date of Patent: May 1, 2018

(54) SOLAR TRACKER, SUN TRACKING METHOD, SOLAR POWER GENERATOR, AND CONTROLLER

(71) Applicant: Panasonic Corporation, Osaka (JP)

(72) Inventors: Ryutaro Futakuchi, Osaka (JP); Masaki Yamamoto, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 439 days.

(21) Appl. No.: 14/191,911

(22) Filed: Feb. 27, 2014

(65) Prior Publication Data

US 2014/0175260 A1  Jun. 26, 2014

Related U.S. Application Data

(63) Continuation of application No. PCT/JP2013/003475, filed on Jun. 3, 2013.

(30) Foreign Application Priority Data

Dec. 25, 2012  (JP) .................................. 2012-281008

(51) Int. Cl.
*G01J 1/20* (2006.01)
*H02S 20/00* (2014.01)
(Continued)

(52) U.S. Cl.
CPC .................. *H02S 20/00* (2013.01); *F24J 2/38* (2013.01); *G01S 3/7861* (2013.01); *H02S 20/32* (2014.12); *Y02B 10/12* (2013.01); *Y02E 10/47* (2013.01)

(58) Field of Classification Search
CPC ........... G01S 3/7861; F24J 2/38; H02S 20/00; H02S 20/32
(Continued)

(56) References Cited

U.S. PATENT DOCUMENTS 6,465,725 B1  10/2002  Shibata et al.
2008/0272279 A1*  11/2008  Thompson ........ H01L 31/02021
                                                        250/206
(Continued)

FOREIGN PATENT DOCUMENTS

JP  05-297952 A  11/1993
JP  2000-196126 A  7/2000
(Continued)

OTHER PUBLICATIONS

International Search Report for corresponding International Application No. PCT/JP2013/003475 dated Jun. 25, 2013.
(Continued)

*Primary Examiner* — Thanh Luu
*Assistant Examiner* — Kevin Wyatt
(74) *Attorney, Agent, or Firm* — Renner, Otto, Boisselle & Sklar, LLP

(57) ABSTRACT

A solar tracker comprises: a measuring section which measures the quantity of electric power generated by a solar panel; a solar position getting section which gets information about the theoretical solar position; a driving section which changes the orientation of the solar panel; a dither control section which measures a solar position; a positional shift measuring section which measures a solar positional shift between the measured solar position and the theoretical solar position. The driving section corrects the theoretical solar position based on the estimated attitude error and controls the orientation of the solar panel based on the theoretical position corrected.

15 Claims, 10 Drawing Sheets

(51) Int. Cl.
*G01S 3/786* (2006.01)
*H02S 20/32* (2014.01)
*F24J 2/38* (2014.01)

(58) Field of Classification Search
USPC ...................................... 250/203.4; 136/246
See application file for complete search history.

(56) References Cited

U.S. PATENT DOCUMENTS

| | | | | |
|---|---|---|---|---|
| 2009/0151769 A1* | 6/2009 | Corbin | ....................... | F24J 2/16 136/246 |
| 2010/0198420 A1* | 8/2010 | Rettger | ................... | G01W 1/10 700/291 |
| 2011/0067750 A1* | 3/2011 | Ueda | .......................... | F24J 2/38 136/246 |
| 2011/0096165 A1* | 4/2011 | Zeng | ...................... | B60J 3/0204 348/148 |
| 2011/0163222 A1* | 7/2011 | Moser | ....................... | F24J 2/38 250/203.4 |
| 2012/0168606 A1* | 7/2012 | Tseng | .................... | G01S 3/7861 250/203.4 |
| 2012/0193512 A1* | 8/2012 | Wu | ............................ | F24J 2/38 250/203.4 |
| 2013/0112188 A1* | 5/2013 | Reynolds | ................... | F24J 2/38 126/585 |

FOREIGN PATENT DOCUMENTS

| | | |
|---|---|---|
| JP | 2001-217445 A | 8/2001 |
| JP | 2007-019331 A | 1/2007 |
| JP | 2009-186094 A | 8/2009 |
| JP | 2010-067716 A | 3/2010 |
| JP | 2012-127575 A | 7/2012 |
| JP | 2012-195548 A | 10/2012 |

OTHER PUBLICATIONS

Form PCT/ISA/237 for corresponding International Application No. PCT/JP2013/003475 dated Jun. 25, 2013.

* cited by examiner

SOLAR TRACKER, SUN TRACKING METHOD, SOLAR POWER GENERATOR, AND CONTROLLER

This is a continuation of International Application No. PCT/JP2013/003475, with an international filing date of Jun. 3, 2013, which claims priority of Japanese Patent Application No. 2012-281008, filed on Dec. 25, 2012, the contents of which are hereby incorporated by reference.

BACKGROUND

1. Technical Field

The present application relates to a solar tracker and a sun tracking method, and more particularly relates to a solar tracker and sun tracking method which may be used in a solar power generator which generates electric power by making a solar panel concentrate incoming sunlight while tracking the sun. The present application further relates to a solar power generator including such a solar tracker and a controller and control program for use in such a solar tracker.

2. Description of the Related Art

A sun-tracking solar power generator is known as a kind of solar power generator, and includes a solar tracker which orients a single or multiple concentrating photovoltaic generator modules that generate electric power by receiving the sunlight toward the sun.

A typical concentrating photovoltaic generator module includes a condenser lens which concentrates incoming sunlight and a solar panel (photovoltaic cell) which generates electric power by receiving the concentrated sunlight. If the solar collector plane of the photovoltaic generator module shifted to stop intersecting with the axis of the incoming sunlight at right angles, then the spot of convergence of the sunlight would not be formed on the surface of the solar panel. In that case, the power generating efficiency might decrease. For that reason, the solar tracker should track the sun accurately so that the solar collector plane of the photovoltaic generator module faces directly the sun.

Japanese Laid-Open Patent Publication No. 2001-217445 teaches calculating the sun's azimuth based on the date and time. The device disclosed in Japanese Laid-Open Patent Publication No. 2001-217445 corrects the azimuth angle and tilt angle by rectifying the error of its internal clock. Specifically, the solar tracker calculates the difference between the meridian passage time according to its internal clock and the point in time when the azimuth angle of the photovoltaic generator module is actually due south. And based on this time difference, the solar tracker rectifies its internal clock so that the photovoltaic generator module exactly faces the sun.

SUMMARY

According to such a configuration for calculating the azimuth of the sun based on the date and time, however, if the orientation of the solar power generator itself was significantly different from its target orientation, it would be very difficult to correct the orientation. In addition, in such a situation, even if the tracking error could be corrected successfully at a particular date and time so that the solar power generator can track the sun accurately, the error could rather increase at a different date and time.

Embodiments of the present disclosure provide a solar tracker which can track the sun just as intended by correcting an attitude error that could occur while the solar tracker is being installed.

In one general aspect, a solar tracker disclosed herein comprises: a supporting mechanism configured to support a solar panel so as to change an orientation of the solar panel, the solar panel including a concentrating photovoltaic generator module which generates electric power using sunlight received; a measuring section which measures the quantity of the electric power generated by the solar panel; a solar position getting section which gets information about a theoretical solar position at an arbitrary point in time; a driving section which changes the orientation of the solar panel so that a normal to a solar collector plane of the solar panel tracks the sun; a dither control section which is connected to the driving section and which performs a dither operation by changing the orientation of the solar panel so that the normal to the solar panel scans a predetermined range to be determined by the theoretical solar position; a positional shift measuring section which measures a value of a solar positional shift between a measured solar position to be determined based on the distribution of the quantities of electric power generated by the solar panel that have been measured by the measuring section during the dither operation and the theoretical solar position; and an attitude error estimating section which gets an estimated attitude error of the supporting mechanism based on the measured value of the solar positional shift and which updates the estimated attitude error based on the respective degrees of reliability of the measured value of the solar positional shift and the attitude error. The driving section corrects the theoretical solar position based on the estimated attitude error that has been updated and controls the orientation of the solar panel based on the theoretical position corrected. And the degree of reliability of the measured value is determined based on the distribution of the quantities of electric power generated by the solar panel that have been measured.

In another aspect, a solar power generator disclosed herein comprises: the solar tracker described above; and a solar panel which is supported by the supporting mechanism of the solar tracker.

In another aspect, a solar tracker controller disclosed herein is designed to be used in the solar tracker described above, and the controller includes: a driving section which changes the orientation of the solar panel so that a normal to a solar collector plane of the solar panel tracks the sun; a dither control section which is connected to the driving section and which performs a dither operation by changing the orientation of the solar panel so that the normal to the solar panel scans a predetermined range to be determined by a theoretical solar position; a positional shift measuring section which measures a value of a solar positional shift between a measured solar position to be determined based on the distribution of the quantities of electric power generated by the solar panel that have been measured by the measuring section during the dither operation and the theoretical solar position; and an attitude error estimating section which gets an estimated attitude error of the supporting mechanism based on a solar positional shift measured value and which updates the estimated attitude error based on the respective degrees of reliability of the measured value of the solar positional shift and the attitude error. The driving section corrects the theoretical solar position based on the estimated attitude error that has been updated and controls the orientation of the solar panel based on the theoretical position corrected.

In another aspect, a method for estimating the attitude error of a solar tracker disclosed herein comprises the steps of: setting up a supporting mechanism on a base, the supporting mechanism supporting a solar panel, including a concentrating photovoltaic generator module which generates electric power using sunlight received, so as to be ready to change the orientation of the solar panel; getting information about a theoretical solar position at an arbitrary point in time; performing a dither operation by changing the orientation of the solar panel so that a normal to the solar panel scans a predetermined range to be determined by the theoretical solar position; measuring the quantity of electric power generated by the solar panel during the dither operation, determining a measured solar position based on the distribution of the quantities of electric power generated that have been measured, and measuring a value of a solar positional shift between the measured solar position that has been determined and the theoretical solar position; and getting an estimated attitude error of the supporting mechanism based on the measured value of the solar positional shift and updating the estimated attitude error based on the respective degrees of reliability of the measured value of the solar positional shift and the attitude error.

In another aspect, a sun-tracking method disclosed herein comprises the step of correcting a theoretical solar position based on an estimated attitude error that has been updated and obtained by the method described above and controlling the orientation of the solar panel based on the theoretical position corrected.

In another aspect, a program for controlling a solar tracker disclosed herein is configured to make the solar tracker perform the steps of: getting information about a theoretical solar position at an arbitrary point in time; performing a dither operation by changing the orientation of the solar panel so that a normal to the solar collector plane of the solar panel, including a concentrating photovoltaic generator module which generates electric power using sunlight received, scans a predetermined range to be determined by the theoretical solar position; measuring the quantity of electric power generated by the solar panel during the dither operation, determining a measured solar position based on the distribution of the quantities of electric power generated that have been measured, and measuring a value of a solar positional shift between the measured solar position that has been determined and the theoretical solar position; and getting an estimated attitude error of the supporting mechanism based on the measured value of the solar positional shift and updating the estimated attitude error based on the respective degrees of reliability of the measured value of the solar positional shift and the attitude error.

According to embodiments of the present disclosure, the solar positional shift can be corrected by estimating an attitude error of a solar tracker, and therefore, electric power can be generated more efficiently. In addition, according to an embodiment, the solar position can be tracked accurately even without using a sensor.

According to embodiments of the present disclosure, the solar positional shift can also be corrected by means of software, and therefore, can be corrected easily. As long as an estimated attitude error can be obtained, there is no need to always sense the solar position.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

DETAILED DESCRIPTION

First of all, it will be described what problem will arise if a solar tracker has such an attitude error.

Figure 1A:
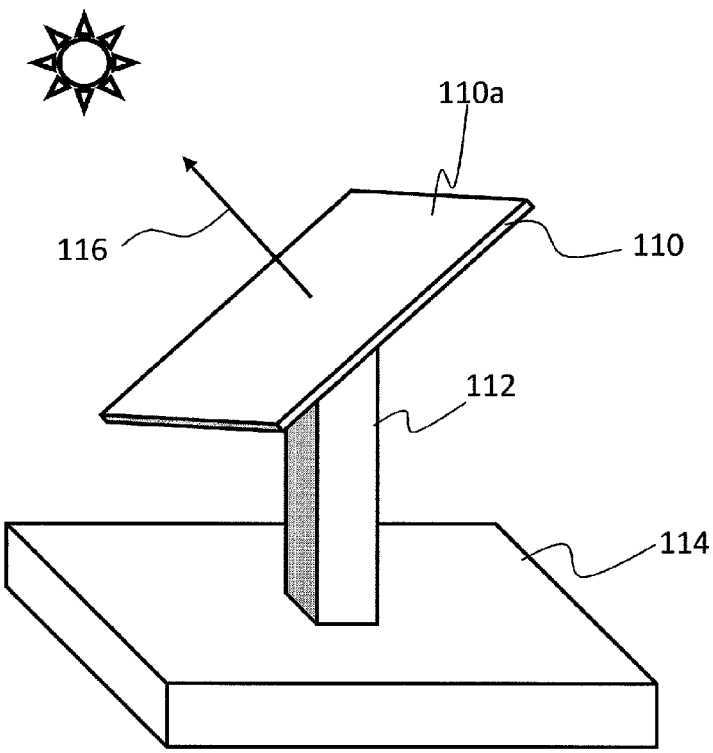
FIG. 1A is a perspective view schematically illustrating how a supporting mechanism 112 for supporting a solar panel 110 is fixed on a base 114 such as the ground.

FIG. 1A is a perspective view schematically illustrating how a mechanism for supporting a solar panel 110 (which will be referred to herein as a "supporting mechanism 112") is fixed on a base 114 such as the ground. The supporting mechanism 112 may be a strut, for example. The solar panel 110 has been attached to the supporting mechanism 112 so as to be ready to change its orientation. And the orientation of the solar panel 110 can be changed with respect to the supporting mechanism 112. The solar panel 110 is configured to have an array of a plurality of concentrating photovoltaic generator modules that are arranged on a substrate. In the state shown in FIG. 1A, a normal 116 to the solar collector plane 110a of the solar panel 110 faces the sun. In other words, a light ray radiated from the sun is incident perpendicularly onto the solar collector plane 110a. In this description, the direction of the normal 116 to the solar collector plane 110a of the solar panel 110 will be referred to herein as the "orientation of the solar panel 110".

Since the planet Earth rotates itself, the solar position, the position of the sun, changes incessantly from time to time. Thus, this solar tracker controls the orientation of the solar panel 110 so as to track the sun that is moving across the sky. The solar position can be obtained accurately based on the longitude, latitude and altitude of the solar tracker and on the current date and time. That is why even while the solar position is changing with time, if the solar panel 110 gets oriented toward the solar position that has been calculated, the light ray radiated from the sun can always be incident perpendicularly onto the solar collector plane 110a of the solar panel 110. In tracking the sun, the orientation of the solar panel 110 is controlled with respect to the supporting mechanism 112. For that reason, the supporting mechanism 112 should be fixed to have the originally intended attitude (the designed position) toward the base 114.

Figure 1B:
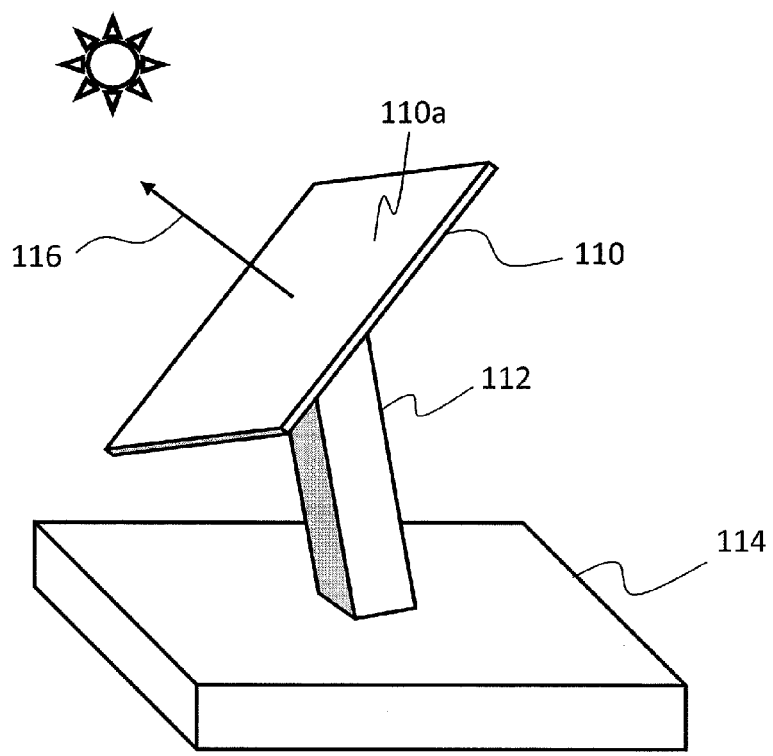
FIG. 1B is a perspective view schematically illustrating a state where the supporting mechanism 112 is tilted with respect to the base 114.

The supporting mechanism 112 is typically fixed on the ground. However, the supporting mechanism 112 is not necessarily fixed on the ground but may also be fixed on the sidewall or roof of a building, the base of a building, a highway, a bridge, or any other structure. In this description, the ground and those other structures on which the supporting mechanism 112 can be fixed will be collectively referred to herein as the "base". When the supporting mechanism 112 is fixed on the base 114, the attitude of the supporting mechanism 112 may sometimes be different from the intended one as shown in FIG. 1B. In addition, even after the supporting mechanism 112 has been fixed onto the base 114, the supporting mechanism 112 may still have its attitude affected by some external force produced by strong wind or an earthquake.

FIG. 1B is a perspective view schematically illustrating a state where the supporting mechanism 112 does not have its intended attitude but is tilted with respect to the base 114. In such a state, even if the orientation of the solar panel 110 with respect to the supporting mechanism 112 is adjusted so as to correspond to the solar position that has been calculated, the solar panel 110 is still not oriented exactly toward the sun, because the supporting mechanism 112 has a wrong attitude. That is to say, the normal 116 to the solar collector plane 110a of the solar panel 110 shown in FIG. 1B does not face the sun, and the light ray radiated from the sun will be incident obliquely onto the solar collector plane 110a of the solar panel 110. As will be described in detail later, if the light ray radiated from the sun is incident obliquely onto a concentrating photovoltaic generator module, the quantity of electric power generated tends to decline significantly.

In this description, the magnitude of the error between the actual and intended attitudes of the supporting mechanism 112 will be referred to herein as an "attitude error". This attitude error is determined by the "attitude" of the supporting mechanism 112 in a three-dimensional space, and therefore, can be represented by three parameters. And those three parameters may be defined by a set of three numerical values that represent the "rotation" of the supporting mechanism's own three-dimensional orthogonal coordinates and that correspond to the three-dimensional orthogonal coordinates as a reference.

Figure 2A:
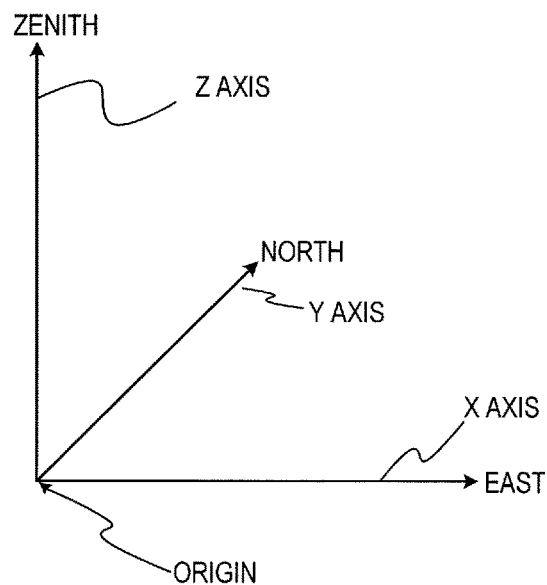
FIG. 2A shows an exemplary set of three-dimensional orthogonal coordinates to be used as a reference.

FIG. 2A shows an exemplary set of three-dimensional orthogonal coordinates to be used as a reference. The X axis runs eastward from the origin, the Y axis runs northward from the origin, and the Z axis runs toward the zenith from the origin. In this case, the origin corresponds to the position where the supporting mechanism 112 is set up.

Figure 2B:
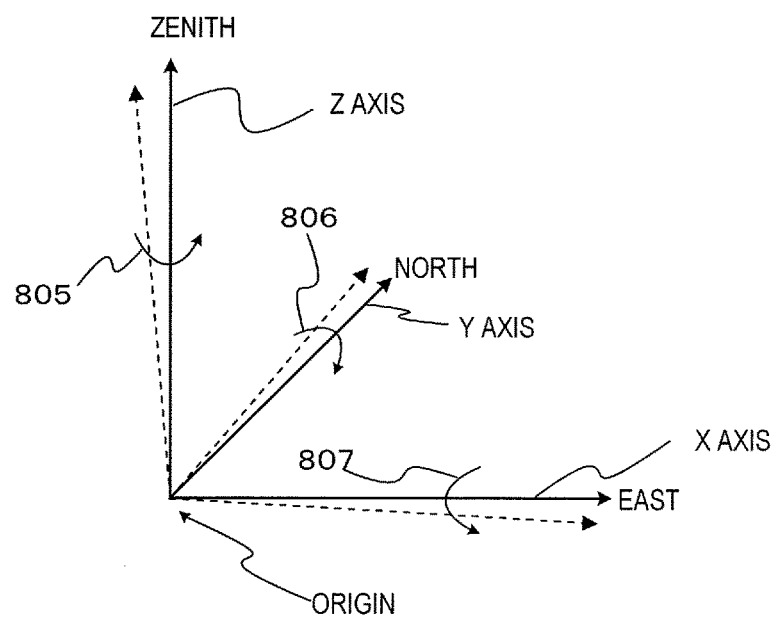
FIG. 2B shows how the three-dimensional orthogonal coordinates with respect to the supporting mechanism 112 (as indicated by the dotted lines) have rotated from the original three-dimensional orthogonal coordinates as a reference (as indicated by the solid lines).

FIG. 2B shows how the supporting mechanism 12 has caused an attitude error to get the three-dimensional orthogonal coordinates with respect to the supporting mechanism 112 (as indicated by the dotted lines) rotated from the original three-dimensional orthogonal coordinates as a reference (as indicated by the solid lines). It should be noted that these two sets of three-dimensional orthogonal coordinates share the same origin. As shown in FIG. 2B, the shift between these two sets of three-dimensional orthogonal coordinates can be represented by a "roll" that is rotation 805 on the Z axis, a "pitch" that is rotation 806 on the Y axis, and a "yaw" that is rotation 807 on the X axis.

In an embodiment of the present disclosure, this set of three numerical values, namely, pitch, roll and yaw, which define the magnitude of shift of the actual attitude of the supporting mechanism 112 from the original one, will be used herein as representing the "attitude error". It is difficult to accurately determine the attitude error using an instrument. According to an embodiment of the present disclosure, however, the attitude error can be estimated with electric power generated using the sunlight after the solar tracker has been installed.

Figure 3:
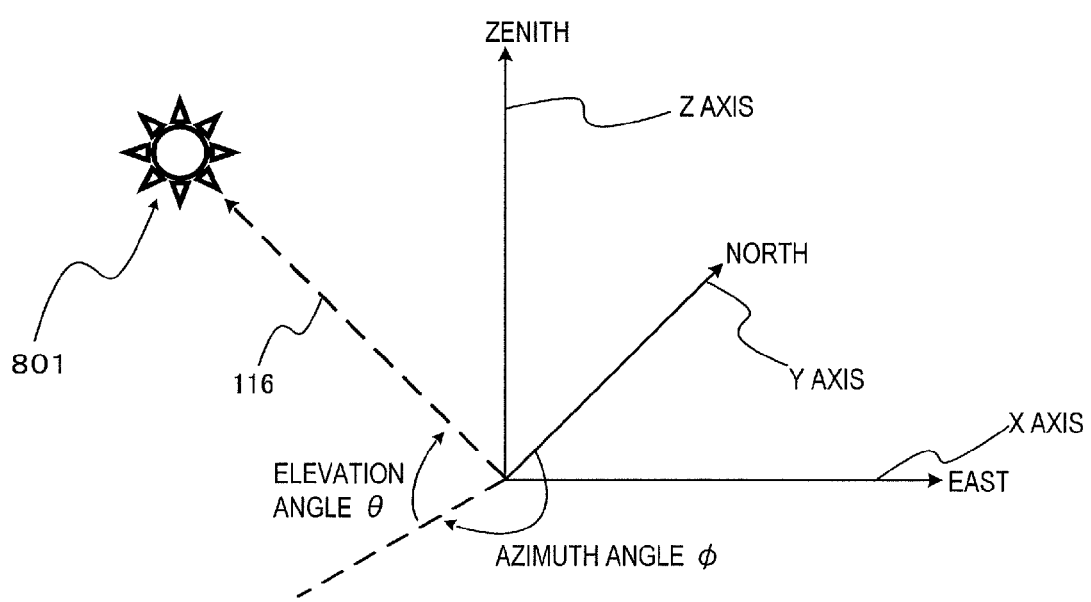
FIG. 3 shows the azimuth angle and elevation angle of the solar position 801.

As shown in FIG. 3, the solar position (sun's position) 801 can be represented by two-dimensional parameters that are the azimuth angle φ and angle of elevation (altitude) θ as defined by the normal 116 to the solar collector plane 110a of the solar panel 110. That is to say, this is a north-based orthogonal coordinate system. In this case, the azimuth angle φ is the angle defined by a perpendicular projection of the normal 116 to the solar collector plane 110a of the solar panel 110 onto the XY plane with respect to the Y axis. On the other hand, the angle of elevation θ is the angle defined by a perpendicular projection of the normal 116 onto the XY plane with respect to the normal 116. By measuring the solar position 801, these azimuth and elevation angles can be obtained as two numerical values. These azimuth and elevation angles depend on the three-dimensional orthogonal coordinates, which are determined by the supporting mechanism 112 of the solar panel 110.

As shown in FIG. 2B, in a situation where the supporting mechanism 112 is actually tilted with respect to its original attitude, even if the azimuth angle φ1 and angle of elevation θ1 as defined by the normal 116 to the solar collector plane 110a of the solar panel 110 are obtained with respect to the solar position that has been calculated (i.e., the theoretical solar position), those azimuth and elevation angles φ1 and θ1 are values that have been obtained on the supposition that the coordinate system is just as indicated by the solid lines in FIG. 2B. For that reason, if the actual attitude of the supporting mechanism 112 is tilted with respect to its originally intended one, an error will be caused between the azimuth and elevation angles φa and θa corresponding to the sun's actual position 801 that is based on that coordinate system (as indicated by the dashed lines) because the reference coordinate system has rotated to an unknown angle as indicated by the dashed lines in FIG. 2B. In this description, this error will be referred to herein as a "tracking error", which can be defined to be the error between those two numerical values representing the azimuth and elevation angles φ and θ. That is to say, [Δφ, Δθ]=[φa−φ1, θa−θ1]. Such a tracking error is caused due to the rotation of the coordinate system shown in FIG. 2B, which in turn results from the attitude error of the supporting mechanism 112.

In a situation where the attitude of the supporting mechanism 112 is actually tilted with respect to its originally intended one as shown in FIG. 2B, even if a tracking error of the solar position 801 has been detected, three unknown numbers [roll, pitch, yaw] defining the attitude error cannot be determined unequivocally based on two numerical values [Δφ, Δθ] defining the tracking error. The reason is that there are more (three) unknown numbers than the two numerical values obtained by measurement.

The solar tracker of the present disclosure has the function of estimating the three unknown numbers [roll, pitch, yaw] defining the attitude error based on the two numerical values (measured values) defining the tracking error.

Hereinafter, embodiments of the present disclosure will be described in detail.

Embodiment 1

Figure 4:
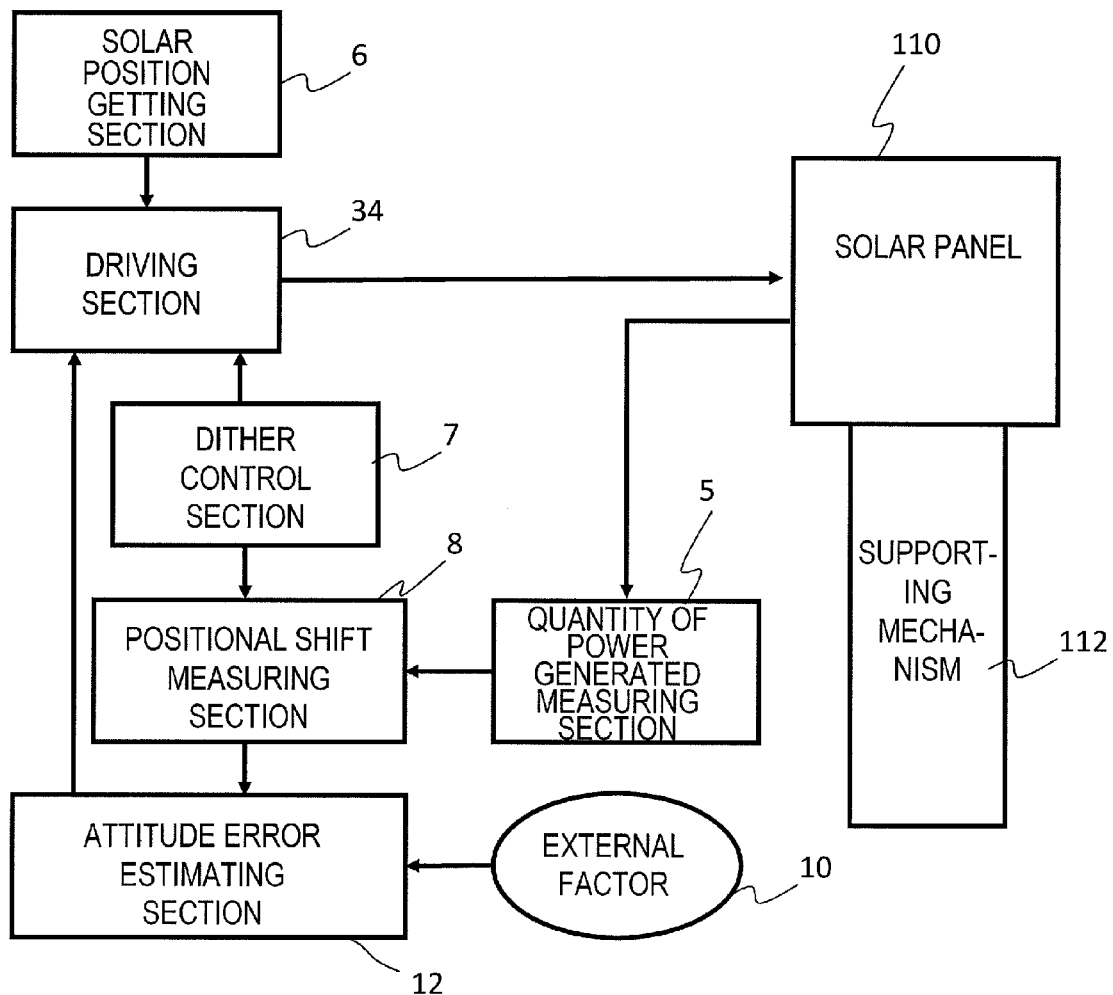
FIG. 4 is a block diagram illustrating a configuration for a solar tracker according to an embodiment of the present disclosure.

A solar tracker according to this embodiment has the configuration shown in FIG. 4. The solar tracker shown in FIG. 4 includes a supporting mechanism 112 which supports a solar panel 110 so as to be ready to change the orientation of the solar panel (110), a quantity of power generated measuring section 5 which measures the quantity of the electric power generated by the solar panel 110, a solar position getting section 6 which gets information [φ1, θ1] about the theoretical solar position at an arbitrary point in time, and a driving section 34 which changes the orientation of the solar panel 110 so that a normal to a solar collector plane 110a of the solar panel 110 tracks the sun.

The solar panel 110 has a configuration in which a plurality of concentrating photovoltaic generator modules are arranged two-dimensionally on its solar collector plane. Each of those photovoltaic generator modules includes a photovoltaic element which converts incoming sunlight into electric energy and an optical element such as a lens for concentrating the sunlight onto that element. The photovoltaic element for use in this embodiment has a size which is much smaller than the photosensitive area of each photovoltaic generator module. The photosensitive area of a single photovoltaic element is typically as small as a rectangular area which has a size of 2 to 10 mm square. The optical element concentrates sunlight which has been incident on a relatively wide area toward such a small photovoltaic element. For example, the ratio of the aperture area of the optical element to the photosensitive area of a single photovoltaic element may be in the range of 500 to 1000. If the optical axis of the optical element such as a lens shifted by 0.1 degrees with respect to the sun, sometimes the sunlight could not be concentrated appropriately onto the photovoltaic element.

The supporting mechanism 112 is configured to rotate the solar panel 110 in at least two axial directions. Typically, the supporting mechanism 112 supports the solar panel on biaxial bearings and can rotate the solar panel to any arbitrary angle around each of those two axes thanks to the action of the driving section 34.

The quantity of power generated measuring section 5 is configured to measure part or all of the quantity of the electric power generated by the solar panel 110. For example, the quantity of the electric power generated can be measured by measuring the amount of short-circuit current Isc flowing through the solar panel 110.

The solar position getting section 6 obtains the azimuth angle φ1 and elevation angle θ1 that define the solar position along the normal to the solar panel 110 based on the setup location (which is represented by the longitude, latitude and altitude) and the date and time. The set of azimuth and elevation angles φ1 and θ1 defining the solar position which have been obtained by the solar position getting section 6 can be represented by a vector [φ1, θ1], which indicates the theoretical solar position. The azimuth and elevation angles φ1 and θ1 defining the solar position may be obtained by calculation or retrieved from a database. If these angles need to be calculated, any of various solar position calculating algorithms that have been disclosed so far may be adopted to do that. Meanwhile, the database may be a table on which the setup location (longitude, latitude, altitude), the date and time, and the azimuth and elevation angles φ and θ defining the solar position are associated with each other. Such a database may be stored in the solar position getting section 6 or in an external memory or server which is connected to the solar position getting section 6.

Even if the solar panel 110 is driven by operating the driving section 34 based on the theoretical solar position [φ1, θ1] that has been obtained by the solar position getting section 6, the normal to the solar collector plane 110a of the solar panel 110 may not exactly point the solar position. The reason is that the attitude error of the supporting mechanism 112 is not taken into account. Unless the normal to the solar collector plane 110a of the solar panel 110 exactly points toward the solar position due to the attitude error of the supporting mechanism 112, the solar panel 110 cannot achieve the expected power generating efficiency (i.e., quantity of electric power generated).

The driving section 34 may include a driving section which rotates the solar panel 110 so that the normal to the solar panel 110 agrees with the direction which is defined by arbitrary azimuth and elevation angles φ and θ using the setup location of the solar panel 110 as the origin, and a control section which controls the driving section so that the normal to the solar panel 110 points toward the solar position based on the output of the attitude error estimating section 12 to be described later. Such a control section may be implemented as either a piece of hardware or a combination of a general-purpose or dedicated processor and a software program.

Figure 5:
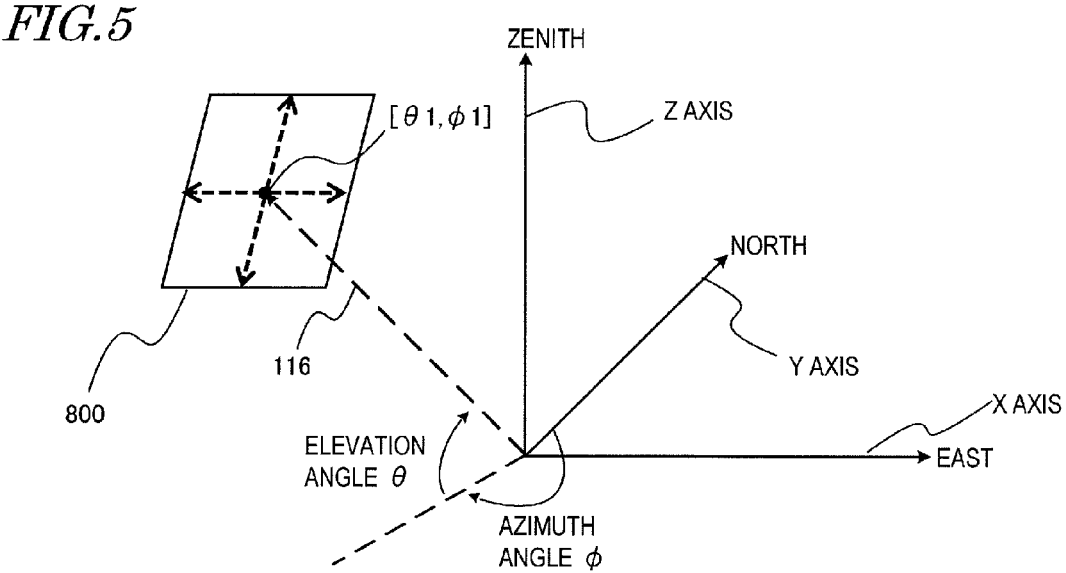
FIG. 5 shows a predetermined range 800 which starts from the theoretical solar position [φ1, θ1] that has been obtained by the solar position getting section 6.

This solar tracker further includes a dither control section 7, which performs a dither operation by changing the orientation of the solar panel (110) so that the normal to the solar panel 110 scans a predetermined range to be determined by the theoretical solar position [φ1, θ1]. More specifically, the dither control section 7 changes the azimuth angle φ and elevation angle θ of the normal 116 to the solar panel 110 in predetermined steps so as to scan the predetermined range 800 which has been defined to start from, and include, the theoretical solar position [φ1, θ1] that has been obtained by the solar position getting section 6 as shown in FIG. 5. Such an operation will be referred to herein as a "dither operation".

While the dither operation is being performed on the solar panel 110, the quantity of power generated measuring section 5 sequentially measures the quantity of the electric power generated by the solar panel 110. According to this embodiment, the relation between the orientation of the solar collector plane of the solar panel 110 and the quantity of the electric power generated (i.e., the distribution of the quantities of the electric power generated) can be obtained in this manner.

Figure 6:
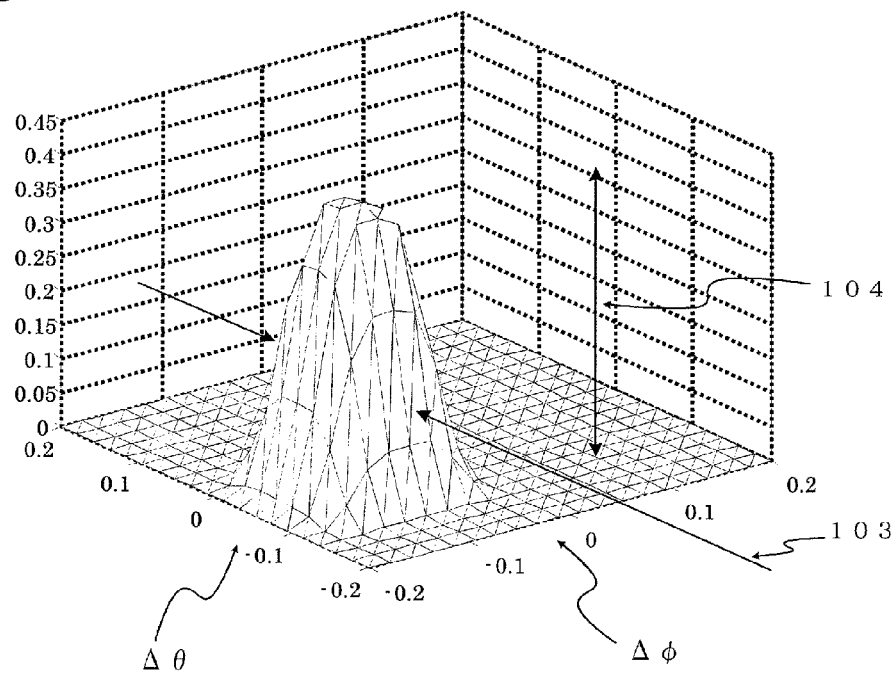
FIG. 6 shows a received light intensity distribution.

FIG. 6 is a graph showing an exemplary distribution of the intensities of the light received at the solar panel 110. In FIG. 6, the ordinate represents the intensity of the light received, and the abscissas represent the magnitude of movement Δφ (in degrees) in the azimuth angle direction and the magnitude of movement Δθ (in degrees) in the elevation angle direction as a result of the dither operation.

A concentrating photovoltaic generator module 100 for use in this embodiment has a light receiving angle of approximately 0.1 degrees (=0.0016 radians), and therefore, the distribution of received light intensities has a peak every 0.1 degrees. The peak width 103 of the distribution of the received light intensities represents a size of a region which has a predetermined level with respect to a peak value 104.

The peak width 103 may be, but does not have to be, a full width at half maximum (or simply a "half width"). In this description, the "light receiving angle" refers herein to the width (or range) of the angle of incidence at which incoming sunlight can be converted into electric energy.

The distribution of the quantities of the electric power generated reaches its peak when the normal 116 to the solar collector plane 110a of the solar panel 110 points exactly toward the actual position of the sun. The measured solar position can be determined based on the distribution of the quantities of the electric power generated by the solar panel 110 that has been measured by the quantity of power generated measuring section 5 during the dither operation.

$\Delta\varphi$ and $\Delta\theta$ defining the direction in which the distribution of the received light intensities reaches its peak value 104 both become zero unless there is any attitude error. According to the results of the exemplary measurement shown in FIG. 6, neither $\Delta\varphi$ nor $\Delta\theta$ is zero, which indicates that an attitude error has been caused. If a control operation is performed so that the normal to the solar panel 110 points exactly toward the theoretical solar position [φ1, θ1] that has been obtained by the solar position getting section 6, the tracking error resulting from the attitude error cannot be reduced sufficiently.

As shown in FIG. 4, the solar tracker of this embodiment further includes a positional shift measuring section 8, which measures the value of the sun's positional shift Yt between the measured solar position and the theoretical solar position to be determined during the dither operation. More specifically, the positional shift measuring section 8 gets the quantity of the electric power generated that has been measured by the quantity of power generated measuring section 5 and variations in the azimuth and elevation angles which are control parameters for the dither control section 7, thereby determining the distribution of the intensities of light received at the solar panel 110. In the following description, the magnitude of the solar positional shift Yt between the measured solar position and the theoretical solar position will be represented herein by the vector [Δφm, Δθm]. Δφm, Δθm respectively correspond to the magnitudes of movement Δφ, Δθ in the azimuth and elevation angle directions in which the distribution of the intensities of the received light reaches its peak value 104 in FIG. 6.

The solar tracker of this embodiment further includes an attitude error estimating section 12, which gets an estimated attitude error Xt (=[roll, pitch, yaw]) of the supporting mechanism 112 based on the magnitude of the solar positional shift Yt that has been measured. And the attitude error estimating section 12 updates the estimated attitude error Xt based on the degree of reliability Rt of the magnitude of the solar positional shift Yt and the degree of reliability Pt of the attitude error (i.e., Xt→Xt+1). A method for getting and updating an estimated value in this manner will be described in detail later.

The driving section 34 corrects the theoretical solar position based on the estimated attitude error (Xt+1) that has been updated and controls the orientation of the solar panel (110) based on the theoretical position corrected.

In this embodiment and each of the other embodiments to be described later, not only the control section of the driving section 34 but also each of the solar position getting section 6, the dither control section 7, the solar positional shift estimating section 8, and the attitude error estimating section 12 may be implemented either partially or entirely as a piece of hardware or a combination of a general-purpose or dedicated processor and a software program. Also, some or all of the functions of the control section of the driving section 34, the solar position getting section 6, the dither control section 7, the solar positional shift estimating section 8, and the attitude error estimating section 12 may be performed by getting a computer program processing step done by a single or multiple processors. That is why the control section of the driving section 34, the solar position getting section 6, the dither control section 7, the solar positional shift estimating section 8, and/or the attitude error estimating section 12 do not have to be implemented as multiple different parts but may also be implemented as respective functional modules of a single arithmetic and logic unit.

The shape of the distribution of received light intensities shown in FIG. 6 may change due to some external factor such as the weather. For example, if the sunlight diffuses due to the presence of clouds, the peak value 104 decreases and the peak width 103 increases. And such a change of shape causes a decrease in the measurement accuracy of the positional shift measuring section 8. For that reason, in some cases, the Δφm and Δθm values which have been measured by the positional shift measuring section 8 may each have dispersion of measurement and the measured values may not have a sufficient degree of reliability. In that case, the attitude error estimating section 12 may determine how high the degree of reliability should be in order to estimate the error accurately. Specifically, if it is determined, by extracting the external factor 10 shown in FIG. 4 by any of various methods, how reliable the result of measurement obtained by the positional shift measuring section 8 should be, the accuracy of the attitude error estimated can be increased. For example, an external factor 10 such as a meteorological condition may be entered in order to set the degree of reliability.

Hereinafter, it will be described as an example how to set the degree of reliability based on at least one of the peak width and peak value of the distribution of received light intensities shown in FIG. 6.

If the peak width of a spectral intensity distribution increases, it means that the spectral intensity distribution comes to have an expanded shape, which corresponds to a decrease in the degree of reliability. That is why the degree of reliability may be set according to the peak width detected as shown in the following Table 1. In this example, the measured value of the peak width is supposed to be represented as a numerical value on a 0.1 degree basis. In this case, the degree of reliability is set so as to represent how much the error is with respect to the magnitude of solar positional shift Yt that has been measured (in degrees). For example, in a Kalman filtering process, the square of this degree of reliability falls within the diagonal component of a covariance matrix Rt of Yt.

TABLE 1

| | Peak width (degrees) | | |
|---|---|---|---|
| | 0.1 to 0.2 | 0.3 to 0.7 | 0.8 to 1.0 |
| Degree of reliability (degrees) | 0.1 | 0.3 | 0.6 |

Likewise, the degree of reliability may also be set based on the peak value of the light intensity distribution as in the following Table 2:

TABLE 2

| | Peak value | | |
|---|---|---|---|
| | 1.0 to 0.8 | 0.7 to 0.4 | 0.3 to 0 |
| Degree of reliability (degrees) | 0.1 | 0.3 | ∞ |

The peak value may be defined as the ratio of the measured value to a theoretical value (which is the maximum expected quantity of electric power generated according to the setup location and the season). A decrease in peak value causes a decrease in the SNR (signal to noise ratio) of the measured value Yt, and therefore, corresponds to a decrease in the degree of reliability. In the example shown in Table 2, if the peak value is equal to or smaller than 0.3, the degree of reliability is set to be ∞. As the peak value, the largest one of the measured values representing the light intensity distribution may be selected but the average of multiple (e.g., three) largest values may also be selected. If the measured values vary significantly, it is effective to use the average of those values in this manner.

Alternatively, the degree of reliability may also be set based on both the peak value and the peak width. In that case, a numerical value determined by the range of the peak values and the range of the peak widths may be given as the degree of reliability as shown in the following Table 3, for example. In the example shown in Table 3, if the peak value and the peak width fall within the best range, the degree of reliability is set to be 0.1° (=0.1 degrees). On the other hand, if the peak value is equal to or smaller than 0.3, the degree of reliability is always set to be ∞ irrespective of the peak width value. In Table 3, any degree of reliability falling within the range of 0.3 to 0.9 degrees is a simple sum of the respective degrees of reliability of its associated peak value and peak width.

TABLE 3

| | | Peak width (degrees) | | |
|---|---|---|---|---|
| | | 0.1 to 0.2 | 0.3 to 0.7 | 0.8 to 1.0 |
| Peak value | 0.8 to 1.0 | 0.1° | 0.5° | 0.6° |
| | 0.4 to 0.7 | 0.3° | 0.6° | 0.9° |
| | 0 to 0.3 | ∞ | ∞ | ∞ |

The degree of reliability does not always have to be set using one of these Tables 1, 2 and 3. Alternatively, the range of the peak values or peak widths may be divided more finely into multiple sub-ranges, for which respectively different degrees of reliability may be set. The degree of reliability may be set in various other ways.

As can be seen from the foregoing description, according to this embodiment, the attitude error estimating section 12 receives the shifts Δφm and Δθm in the azimuth and elevation angle directions that have been measured by the positional shift measuring section 8, and gets the degree of reliability about own attitude error of the device and the external factor 10 such as a meteorological condition as input information. In addition, the attitude error estimating section 12 also takes the degrees of reliability of the shifts Δφm and Δθm that have been measured in the azimuth and elevation angle directions into account as well. And the attitude error estimating section 12 obtains and updates an accurately estimated value of the attitude error of the supporting mechanism 112. After that, the attitude error estimating section 12 obtains correction values for the azimuth and elevation angles with respect to the solar position, which are the results of calculations made by the solar position getting section 6, and enters those correction values into the driving section 34. As a result, the driving section 34 can control the solar panel 10 based on the correction values. By constantly updating the estimated value a number of times, the normal to the solar panel 110 and the direction in which the sunlight irradiates the solar panel 110 can be exactly matched to each other eventually, and the power generation efficiency of (i.e., the quantity of electric power generated by) the solar panel 110 can be kept the best one.

Hereinafter, it will be described how the estimated attitude error of the supporting mechanism 2 can be obtained according to this embodiment.

The attitude error estimating section 12 of this embodiment includes a Kalman filter. Suppose the attitude error of the supporting mechanism 112 is Xt (which is a three-dimensional vector represented by the transpose of [roll, pitch, yaw]), the covariance matrix of the attitude error Xt of the supporting mechanism 112 is Pt, and its standard deviation is its degree of reliability. On the other hand, suppose the measured value of the solar positional shift obtained by the solar positional error measuring section 8 is Yt (which is a two-dimensional vector which is represented by the transpose of [Δφm, Δθm]), the covariance matrix of the measured value of the solar positional shift Yt is Rt, and its standard deviation is its degree of reliability.

A function ht that associates the attitude error Xt with the measured value of the solar positional shift Yt is defined by Yt=ht (Xt). That is why if the attitude error Xt is known, the measured value of the solar positional shift Yt can be obtained by the function ht. It can be determined by coordinate calculation (i.e., rotational transformations of the roll, pitch and yaw axes) how much the normal to the solar panel 110 at that point in time will shift due to the attitude error Xt.

The Kalman filter of the attitude error estimating section 12 performs the estimation in the following well-known procedure.

First of all, the Kalman filter obtains, by the following Equation (1), a Kalman gain Kt in order to determine to what degree the measured value should be relied on. In Equation (1), Ht is a jacobian of the function ht and is calculated in every estimation process of the Kalman filter:

$$K_t = P_t H_t (H_t P_t H_t^T + R_t)^{-1} \quad (1)$$

After the Kalman gain Kt has been obtained, the difference between the measured value of the solar positional shifts Yt and the ht (Xt) is calculated by the following Equation (2). After that, the difference thus obtained is multiplied by the Kalman gain Kt, and the resultant product is added to the attitude error Xt, thereby obtaining a new estimated value Xt+1 to replace Xt.

$$X_{t+1} = X_t + K_t(Y_t - h_t(X_t)) \quad (2)$$

Next, the processing step of updating the covariance matrix Pt of the attitude error Xt into a new covariance matrix Pt+1 using the Kalman gain Kt again as represented by the following Equation (3) is carried out:

$$P_{t+1} = P_t - K_t H_t P_t \quad (3)$$

By performing these processing steps, every time the measured value of the solar positional shift Yt is obtained once, the attitude error Xt gradually converges toward a more correct value according to the covariance matrix Rt of the measured value of the solar positional shift Yt.

Once the converged value X of the attitude error Xt has been obtained, Y (which is a two-dimensional vector represented by the transpose of [Δφc, Δθc]) may be obtained by using the function ht and may be input to the driving section 34 as correction value Δφc, Δθc with respect to the results of calculation made by the solar position getting section 6. As a result, the driving section 34 can control the orientation of the solar panel 110 based on the correction value so that the solar panel 110 can always track the sun.

The present inventors carried out experiments to find how the converging rate of the attitude error Xt changed with the covariance matrix Rt of the measured value of the solar positional shift Yt according to this embodiment. The results will be described with reference to FIG. 7, in which the ordinate represents the estimated attitude error and the abscissa represents the number of times of measurements.

Figure 7:
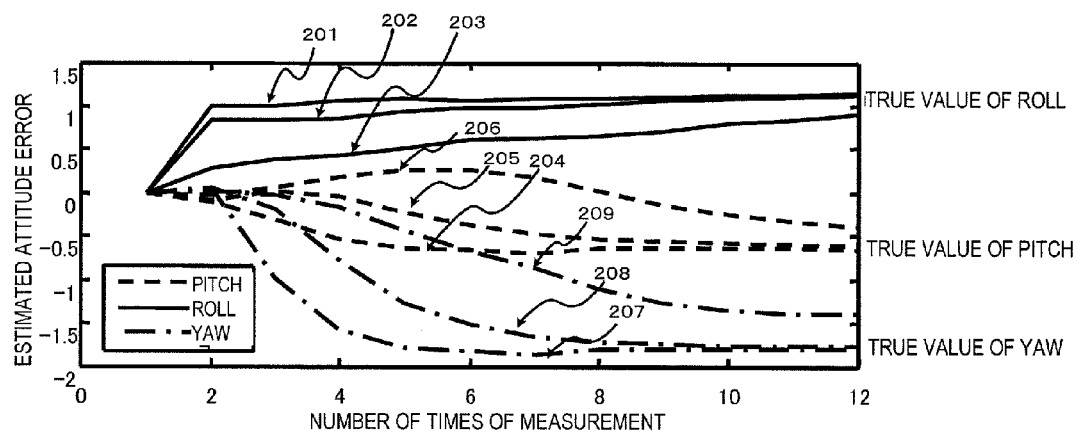
FIG. 7 is a graph showing the results of simulations which are carried out for a solar tracker as a first embodiment of the present disclosure.

FIG. 7 is a graph showing how differently Xt converged according to the covariance matrix Rt of the measured value of the solar positional shift Yt which had been changed into various particular values. The initial value of the covariance matrix Pt of the attitude error Xt was set on the supposition that the attitude error had a standard deviation of approximately 0.6 degrees (=1/100 radians). The squares of 0.1, 0.3 and 1.0 degrees (which indicate that the degree of reliability decreases in this order) were substituted for the diagonal matrix of the covariance matrix Rt of the measured value of the solar positional shift Yt. The standard deviation of the attitude error was supposed to be approximately 0.6 degrees (=1/100 radians) because this device is a structure with a height of a few meters, which is ordinarily supposed to have such a degree of building dispersion in the field of architecture.

In FIG. 7, the curves 201, 202 and 203 indicate how the attitude error converged in a situation where the initial value and the degree of reliability (in this case, the smaller the number, the higher the degree of reliability) were set as described above for the roll attitude error component of the supporting mechanism 112. The curves 204, 205 and 206 indicate how the attitude error converged in a situation where the initial value and the degree of reliability were set as described above for the pitch attitude error component of the supporting mechanism 112. And the curves 207, 208 and 209 indicate how the attitude error converged in a situation where the initial value and the degree of reliability were set as described above for the yaw attitude error component of the supporting mechanism 112. As indicated by these curves, no matter what value the covariance matrix Rt of the measured value of the solar positional shift Yt had, the attitude error Xt did converge to a true value. However, the rate of convergence varied significantly with the value the covariance matrix Rt. And the higher the degree of reliability, the higher the rate of convergence turned out to be. That is to say, the higher the degree of reliability, the more efficiently the attitude error could converge to a true value. In addition, the higher the degree of reliability, the more significantly the influence of some disturbance which will cause a problem in a device to be set up outdoors such as a solar tracker (i.e., the influence of a decrease in the quantity of light that reaches the solar panel 110 directly as described above) could be reduced with this parameter that is the degree of reliability. This is an effect to be achieved by making the estimated attitude error Xt mirror the degree of reliability.

When the estimated roll, pitch and yaw values that define the attitude error converge to certain values, there is a good chance that those converged values are correct estimated values. And when those estimated values are known, the value representing the theoretical solar position can be corrected appropriately, and therefore, the sun can be tracked highly accurately. Once correct estimated values have been obtained, the value representing the theoretical solar position can be corrected appropriately based on those estimated values after that.

The electrical energy into which the sunlight has been converted by the solar panel 110 shown in FIG. 4 may be used by an arbitrary electronic device, stored in a storage cell, or sold through power transmission lines (not shown) as in a known solar power generator.

Next, the present inventors carried out experiments by actually introducing the external factor 10 shown in FIG. 4 to see how the degree of reliability affected the convergence of the attitude error Xt. The results are as follows.

In this case, the external factor 10 is supposed to be the degree to which the sunlight has reached the solar panel 110 directly. And the degree of reliability is set with respect to the peak width (e.g., a half width) of the received light intensity distribution (see FIG. 6), which varies according to the degree of reach. The degree of reliability is set in the following manner.

First of all, suppose weather in which dim sunlight is leaking through a gap in the clouds. Since the clouds will scatter the sunlight, the peak width of the received light intensity distribution increases as a result. As the position of the gap in the clouds does not necessarily agree with the solar position, it is expected that the peak position will also shift. The present inventors carried out simulations on the supposition that the peak position shift and peak width would vary as shown in the following Table 4 when the measurement was done for the first and second times in Table 4. And the covariance matrix Rt of the measured value of the solar positional shift Yt was changed proportionally to the peak width.

TABLE 4

| | | Number of times of measurement | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Shift of peak position | Δφ (degrees) | 3 | 3 | 0 | 0 | 0 | 0 | 0 | 0 | 0 | 0 | 0 |
| | Δθ (degrees) | 3 | 3 | 0 | 0 | 0 | 0 | 0 | 0 | 0 | 0 | 0 |
| Peak width (degrees) | | 1 | 1 | 0.1 | 0.1 | 0.1 | 0.1 | 0.1 | 0.1 | 0.1 | 0.1 | 0.1 |

In Table 4, the upper half of the "peak position shift" row indicates the variation in the magnitude of movement Δφ in the azimuth angle direction shown in FIG. 6 and the lower half thereof indicates the variation in the magnitude of movement Δθ in the elevation angle direction. Also, in Table 4, the numerals "1" through "11" on the "number of times of measurements" row indicate what the number of times of measurement was in a situation where the measurements were done once an hour from seven through seventeen. For example, the number of times of measurement "7" indicates a measurement that was carried out for the seventh time for that day. The measurement was carried out on Sep. 1, 2012 at a latitude approximately 34 degrees north and longitude approximately 134 degrees east. The same stats will apply to the simulations, the results of which are shown in Table 5 to 7 to be described later.

Even when these simulations were carried out, the initial value of the covariance matrix Pt of the attitude error Xt of the supporting mechanism 112 was set on the supposition that the attitude error had a standard deviation of approximately 0.6.

Figure 8:
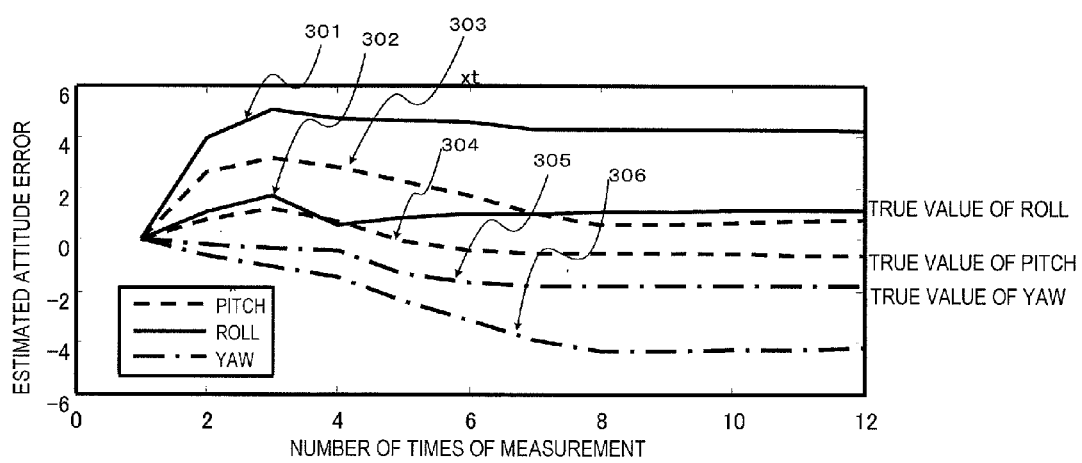
FIG. 8 is a graph showing the results of simulations which are carried out for the solar tracker as the first embodiment of the present disclosure.

FIG. 8 shows how the attitude error Xt converged when the covariance matrix Rt of the measured value of the solar positional shift Yt was set as described above.

In FIG. 8, the curves 302, 304 and 305 indicate how the attitude error Xt converged with respect to respective attitude error components of the supporting mechanism 112 if the covariance matrix Rt of the measured value of the solar positional shift Yt was changed proportionally to the peak width. For the purpose of comparison, the curves 301, 303 and 306 indicate how the attitude error Xt converged with respect to respective attitude error components unless the covariance matrix Rt of the measured value of the solar positional shift Yt was not changed.

According to the results shown in FIG. 8, if the covariance matrix Rt of the measured value of the solar positional shift Yt was changed proportionally, the attitude error Xt did converge to a true value. However, unless the covariance matrix Rt of the measured value of the solar positional shift Yt was changed in that manner, the attitude error Xt converged to a wrong value, which indicates what effect will be achieved if the peak width of the distribution of the quantities of the electric power generated is applied as the degree of reliability.

According to the experiments described above, the covariance matrix Rt of the measured value of the solar positional shift Yt was changed proportionally to the peak width of the received light intensity distribution. However, this is just an example of this embodiment. Alternatively, the solar tracker may have a database on the angular dependence of the photovoltaic generator modules. Still alternatively, such a database may be provided outside of the solar tracker and accessed by the solar tracker over a network. In that case, the peak width of the received light intensity distribution to be expected from the angular dependence of the photovoltaic generator module is compared to the peak width of the received light intensity distribution to be obtained by performing a dither operation actually. And if the peak width measured is relatively broad, the covariance matrix Rt of the measured value of the solar positional shift Yt may be changed so that the degree of reliability decreases. It should be noted that the form of the database may be a graph representing the received light intensity distribution shown in FIG. 6 or a functional value representing that graph. Even if the covariance matrix Rt of the measured value of the solar positional shift Yt is changed in this manner, the attitude error Xt can still be converged to a true value.

It should be noted that if the database is provided for the device, the database may be provided inside of the attitude error estimating section 12 shown in FIG. 4 or data may be retrieved sequentially as needed during the procedure of estimation.

Next, on the supposition that the external factor 10 is the degree to which the sunlight has reached the solar panel directly, the degree of reliability is set with respect to the peak value itself of the received light intensity distribution (see FIG. 6) which has been obtained as a result of the dither operation described above and which varies according to the degree of reach. In carrying out this experiment, the received light intensity distribution obtained as a result of the dither operation shown in FIG. 6 is also used.

First of all, the background of this experiment will be described. The energy falling from the sun on this planet Earth is constant. Therefore, once the latitude and longitude of a given location on the earth are determined, the maximum quantity of electric power generated at that location based on the sunlight falling on that location can be obtained by calculating the solar position as described above. That is why by calculating approximately how much the peak value of measurement has attenuated with respect to this value, the decision can be made whether the sunlight has reached the solar panel 110 directly in an ideal condition or has been scattered or blocked out by some obstacle.

According to this embodiment, the degree of attenuation of the peak value of the received light intensity distribution from its predicted value is mirrored on the covariance matrix Rt of the measured value of the solar positional shift Yt. By doing that, it can be expected that convergence will be delayed with respect to wrong measured data (in a situation where measurement has been carried out on light reflected from a building, for example). Specifically, if the peak value decreases to less than a third of the theoretical value, the decision is made that the measured data of the measured value of the solar positional shift Yt is wrong. In that case, the diagonal element of the covariance matrix Rt of the measured value of the solar positional shift Yt is set to be ∞ (having no degree of reliability) and will not be used to revise the estimated attitude error Xt.

The present inventors carried out simulations on the supposition that the peak value would vary as shown in the following Table 5 when the measurement was done for the first and second times. And the covariance matrix Rt of the measured value of the solar positional shift Yt was changed as described above.

TABLE 5

| | | Number of times of measurement | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Shift of peak position | $\Delta\phi$ (degrees) | 3 | 3 | 0 | 0 | 0 | 0 | 0 | 0 | 0 | 0 | 0 |
| | $\Delta\theta$ (degrees) | 3 | 3 | 0 | 0 | 0 | 0 | 0 | 0 | 0 | 0 | 0 |
| Peak value | | 0.1 | 0.1 | 1 | 1 | 1 | 1 | 1 | 1 | 1 | 1 | 1 |
| Peak width (degrees) | | 0.1 | 0.1 | 0.1 | 0.1 | 0.1 | 0.1 | 0.1 | 0.1 | 0.1 | 0.1 | 0.1 |

Even when these simulations were carried out, the initial value of the covariance matrix Pt of the attitude error Xt of the supporting mechanism 112 was set on the supposition that the attitude error had a standard deviation of approximately 0.6. The results of the simulations are shown in FIG. 9.

Figure 9:
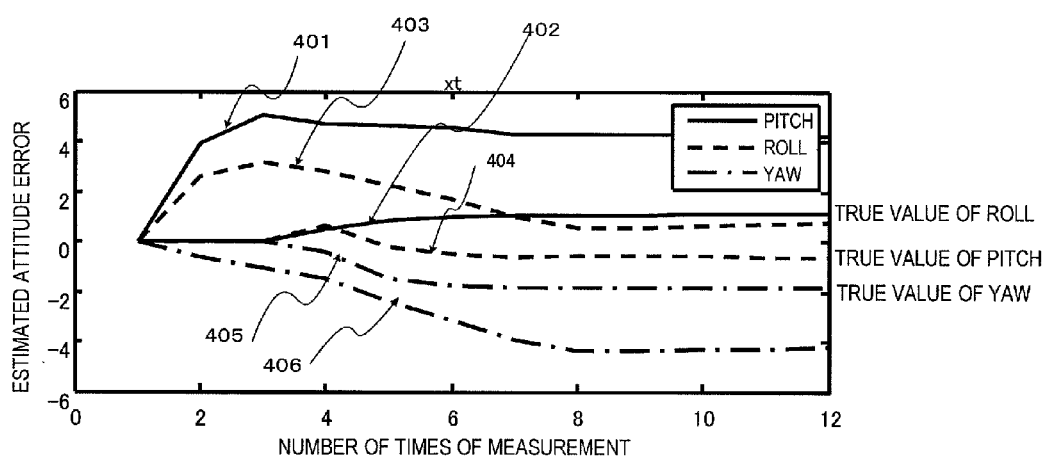
FIG. 9 is a graph showing the results of simulations which are carried out for the solar tracker as the first embodiment of the present disclosure.

In FIG. 9, the curves 402, 404 and 405 indicate how the attitude error Xt converged with respect to respective attitude error components of the supporting mechanism 112 if the covariance matrix Rt of the measured value of the solar positional shift Yt was changed based on the way of setting described above. For the purpose of comparison, the curves 401, 403 and 406 indicate how the attitude error Xt converged with respect to respective attitude error components unless the covariance matrix Rt of the measured value of the solar positional shift Yt was not changed proportionally.

According to the results shown in FIG. 9, it can be seen that if the covariance matrix Rt of the measured value of the solar positional shift Yt was processed according to the peak value as described above, the attitude error Xt did converge to a true value. However, unless the covariance matrix Rt of the measured value of the solar positional shift Yt was processed in that manner, the attitude error Xt failed to converge to a true value, which indicates what effect will be achieved if the peak value of the received light intensity distribution is applied as the degree of reliability.

In carrying out the experiments described above, it is when the peak value decreases to less than a third of the theoretical value, for example, that the decision is made about the degree of reliability that the measured data of the measured value of the solar positional shift Yt is wrong. However, the decision can also be made on the following criterion. Specifically, the solar tracker may have a database on the maximum quantity of electric power that should be generated in the area where the device is installed at the given season of the year. And the higher the ratio of the peak value of the received light intensity distribution (see FIG. 6) to the quantity of electric power that should be generated according to the data in that database, the higher the degree of reliability of the measured value of the solar positional shift Yt may be set to be. Still alternatively, such a database may be provided outside of the solar tracker and accessed by the solar tracker over a network. By providing such a criterion of decision, the attitude error Xt should converge to a true value at an accelerated rate. It should be noted that the form of the database may be a graph representing the received light intensity distribution shown in FIG. 6 or a functional value representing that graph. Also, if such a database is provided for the device, the database may be provided inside of the attitude error estimating section 12 shown in FIG. 4 or data may be retrieved sequentially as needed during the procedure of estimation.

Next, it will be described what if the external factor 10 is the influence of the wind.

The wind is the biggest obstacle to a tracking system. Although the device of this embodiment as a whole is designed to resist a maximum wind velocity of 60 m/s, the vibration or flexure of the structure under the wind can be a factor that would deteriorate the sunlight concentrating ability of a solar panel. For that reason, when the wind velocity is high, the degree of reliability of the measured value of the solar positional shift Yt should be low.

The resistance to wind is proportional to the square of the wind velocity. That is why the diagonal element of the covariance matrix Rt of the measured value of the solar positional shift Yt could be multiplied by the square of the wind velocity. According to this embodiment, however, the covariance matrix Rt of the measured value of the solar positional shift Yt under the influence of the wind was set on the supposition that the wind with a wind velocity of 20 m/s blew intermittently as shown in the following Table 6:

was set so that when the wind velocity was equal to or greater than 10 m/s, the covariance matrix Rt of the measured value of the solar positional shift Yt would be decreased to $(1/100)2$.

The present inventors carried out simulations to predict how the attitude error Xt would converge under such a condition. The results are shown in FIG. 10.

Figure 10:
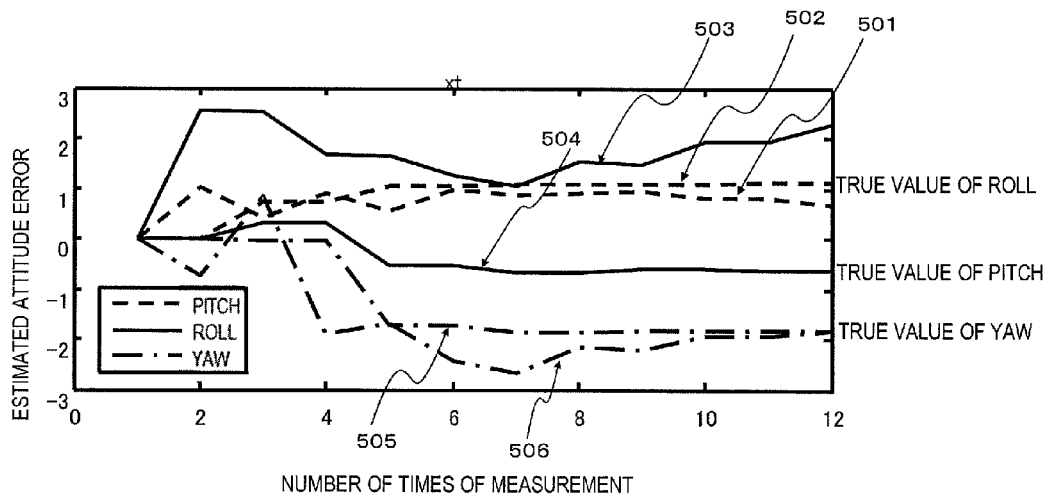
FIG. 10 is a graph showing the results of simulations which are carried out for the solar tracker as the first embodiment of the present disclosure.

In FIG. 10, the curves 502, 504 and 505 indicate how the attitude error Xt converged with respect to respective attitude error components of the supporting mechanism 112 if the covariance matrix Rt of the measured value of the solar positional shift Yt was changed based on the way of setting described above. For the purpose of comparison, the curves 501, 503 and 506 indicate how the attitude error Xt converged with respect to respective attitude error components unless the covariance matrix Rt of the measured value of the solar positional shift Yt was not changed proportionally.

According to the results shown in FIG. 10, it can be seen that in a situation where the wind velocity was equal to or greater than 10 m/s as described above, if the covariance matrix Rt of the measured value of the solar positional shift Yt was changed to decrease to $(1/100)2$ (so as to be mirrored on the degree of reliability), the rate of convergence slowed down but the attitude error still converged to a true value. Meanwhile, it can also be seen that unless the covariance matrix Rt of the measured value of the solar positional shift Yt was changed (i.e., so as not to be mirrored on the degree of reliability), the estimated attitude error Xt came to have an error every time the wind blew, thus making it difficult for the attitude error to converge to a true value. This is an effect to be achieved by applying the wind velocity as the degree of reliability.

As can be seen from the foregoing description, according to the present disclosure, either by changing the covariance matrix Rt of the measured value Yt based on the received light intensity distribution according to some external factor or by changing the degree of reliability with the influence of the wind taken into consideration, the estimated attitude error Xs can be converged to a true value efficiently.

In carrying out the experiments described above, it is when the wind velocity exceeds 10 m/s that the decision is made that the covariance matrix Rt of the measured value of the solar positional shift Yt is decreased (to $(1/100)2$ accord-

TABLE 6

|  |  | Number of times of measurement | | | | | | | | | |
| --- | --- | --- | --- | --- | --- | --- | --- | --- | --- | --- | --- |
|  |  | 1 | 2 | 3 | 4 | 5 | 6 | 7 | 8 | 9 | 10 | 11 |
| Wind velocity | | 20 | 0 | 20 | 0 | 20 | 0 | 20 | 0 | 20 | 0 | 20 |
| Shift of peak position | Δϕ (degrees) | 3 | 0 | 3 | 0 | 3 | 0 | 3 | 0 | 3 | 0 | 3 |
| | Δθ (degrees) | 3 | 0 | 3 | 0 | 3 | 0 | 3 | 0 | 3 | 0 | 3 |
| Peak value | | 1 | 1 | 1 | 1 | 1 | 1 | 1 | 1 | 1 | 1 | 1 |
| Peak width (degrees) | | 0.1 | 0.1 | 0.1 | 0.1 | 0.1 | 0.1 | 0.1 | 0.1 | 0.1 | 0.1 | 0.1 |

According to this Table 6, when the measurement was carried out for an odd number of times, a strong wind with a wind velocity of 20 m/s blew. Suppose that when the measurement was carried out for an odd number of times, the solar tracker was shaken by the wind to shift the solar panel by three degrees in both of the azimuth and elevation angle directions. As a result, the peak of the received light intensity distribution would shift by three degrees in both of the azimuth and elevation angle directions without changing the peak value or peak width. The degree of reliability Rt ing to the experiments described above). However, a wind velocity critical value to be determined by the wind resistance of the device may be defined inside the device and the covariance matrix Rt of the measured value of the solar positional shift Yt may be decreased when the wind velocity exceeds that critical value, which would be no less effective a method than the method described above.

By setting such a criterion of decision, even when a strong wind is blowing at a velocity exceeding the reference value, the attitude error Xt should also converge to a true value.

It should be noted that the wind velocity critical value is defined according to the specification of the device designed. That critical value may be stored in advance in the attitude error estimating section 12 shown in FIG. 1, for example, and may be retrieved sequentially as needed during the procedure of estimation.

Embodiment 2

In the first embodiment described above, in estimating the attitude error Xt, the covariance matrix Rt of the measured value of the solar positional shift Yt is supposed to be set based on the external factor 10. However, the covariance matrix Rt of the measured value of the solar positional shift Yt may also be set by the operator of this device by him- or herself. The reason is that an operator should generally know the setup location very well and should be able to make a decision by all of his or her five senses at what timing the device needs to make a measurement to obtain a measured value with the highest degree of reliability.

Figure 11:
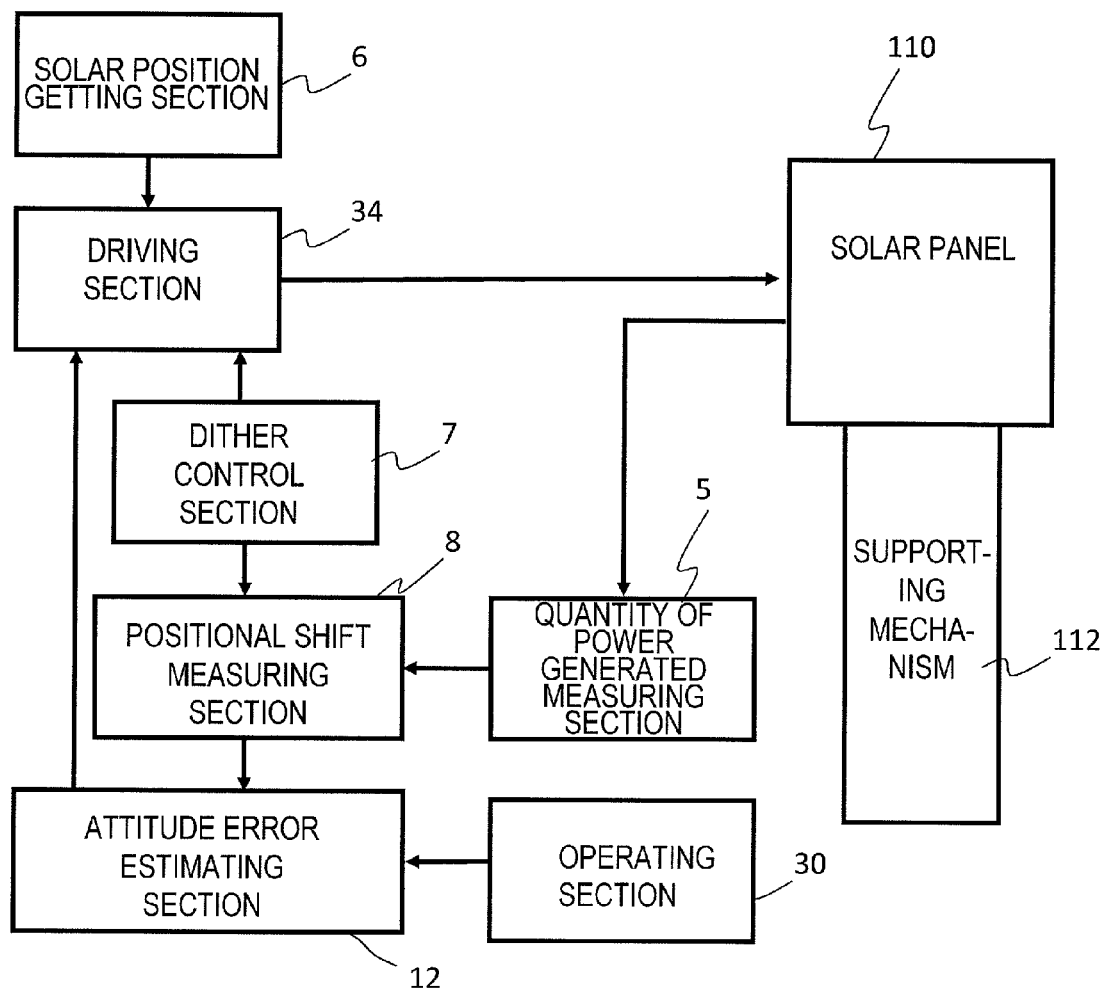
FIG. 11 shows a configuration for a solar tracker as a second embodiment of the present disclosure.

FIG. 11 is a block diagram illustrating a configuration for this second embodiment. In the example shown in FIG. 11, instead of the external factor 10 given to the attitude error estimating section 12 shown in FIG. 4, an operating section 30 to be operated by the operator is connected. The operating section 30 may be a button or switch with which the operator instructs the device to measure the solar positional shift (of which the measured value is Yt). When such a button is pressed down, the degree of reliability is set to be "high" in estimating the attitude error Xt. In this example, if the degree of reliability which the operator knows from his or her experience is normal when the intensity of the sunshine, the wind velocity and other parameters are average ones is supposed to have a standard deviation of 0.1, the "high" degree of reliability is set to be one tenth of that value.

In this second embodiment, the attitude error estimating section 12 described above also has the same basic configuration of a Kalman filter. That is why the attitude error estimating section 12 calculates the differences $\Delta\varphi$ and $\Delta\theta$ between the solar position that has been measured by the positional shift measuring section 8 and calculated by the solar position getting section 6 and the sun's apparent position calculated, and the degree of reliability of the measured value of the solar positional shift Yt (i.e., the covariance matrix Rt of the measured value of the solar positional shift Yt) is set by the operator him- or herself. In this manner, while the attitude error Xt of the supporting mechanism 112 is estimated accurately, the estimated value is updated. As a result, correction values for the azimuth and elevation angles with respect to the solar position that has been obtained by the solar position getting section 6 can be obtained and entered into the driving section 34. In response, the driving section 34 can control the solar panel 110 based on the correction values so that the normal to the solar panel 110 and the direction in which the sunlight irradiates the solar panel 110 agree with each other.

Hereinafter, it will be described how the estimated attitude error Xt converges when the degree of reliability of measurement is set to be high in a situation where the operator specifies the timing of measurement manually.

As described above, suppose the operator should generally know the setup location very well and should be able to make a decision by all of his or her five senses at what timing the device needs to make a measurement. And if a measurement instructing button is provided for the operating section 30 shown in FIG. 11 and if the operator presses down that button when he or she thinks it is the best timing, the degree of reliability is set to be high. That is why the attitude error should be able to be estimated with the environmental disturbance minimized. The simulations were carried out under the condition shown in the following Table 7:

TABLE 7

| | Number of times of measurement | | | | | | | | | | |
|---|---|---|---|---|---|---|---|---|---|---|---|
| | 1 | 2 | 3 | 4 | 5 | 6 | 7 | 8 | 9 | 10 | 11 |
| Case 1 | — | B | B | B | B | B | B | B | B | B | B |
| Case 2 | — | — | — | — | — | — | — | — | — | — | — | where B indicates "button was pressed".

The simulations were carried out in the two cases shown in this Table 7. Specifically, in Case #1, on the supposition that the environment is best suited to measurement, the operator sets the degree of reliability to be high by pressing down the measurement instructing button at regular intervals when the measurement was carried out for the second time and on. In that case, the diagonal element of the covariance matrix Rt of the measured value of the solar positional shift Yt becomes $(1/10)2$ of the system's ordinary value. The reason is that if the degree of reliability which the operator knows from his or her experience is normal when the intensity of the sunshine, the wind velocity and other parameters are average ones is supposed to have a standard deviation of 0.1, the "high" degree of reliability is set to be one tenth of that value as described above.

In Case #2, on the other hand, the system estimated the attitude error on the supposition that the covariance matrix Rt of the measured value of the solar positional shift Yt was a constant value without getting the operator involved.

Figure 12:
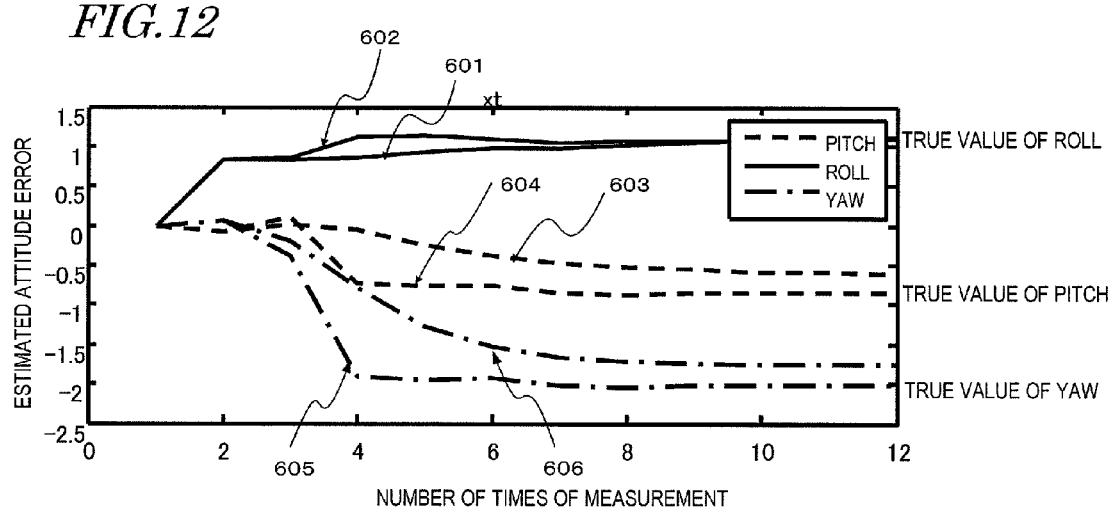
FIG. 12 is a graph showing the results of simulations which are carried out for the solar tracker as the embodiment of the present disclosure.

FIG. 12 shows the results of simulations that were carried out under the condition described above.

In FIG. 12, the curves 602, 604 and 605 indicate how the attitude error Xt converged in a situation where the operator pressed down the button in accordance with his or her own decision (i.e., in Case #1). On the other hand, the curves 601, 603 and 606 indicate how the attitude error Xt converged in a situation where the operator did not press down the button (i.e., in Case #2).

The results shown in FIG. 12 reveal that the attitude error Xt converged earlier when the button was pressed down, which indicates what effect would be achieved by allowing the operator to set the degree of reliability in accordance with his or her own decision.

The experiment of this second embodiment was carried out using only one measurement instructing button and the degree of reliability was set to be high when the button was pressed down. However, a plurality of buttons may be provided instead and "high", "medium" and "low" degrees of reliability may be allocated in advance to those buttons, for example. In that case, when any of those buttons is pressed down, the degree of reliability is set to be its allocated level and the positional shift measuring section 6 can make the measurement. With such a configuration adopted, if the solar positional shift needs to be corrected even when bad weather persists, the attitude error Xt can also be estimated by setting the degree of reliability be the level that the operator thinks is the best from his or her experience using those buttons. That is to say, as the degree of reliability can be set to an appropriate level by the operator from his or her experience according to the surrounding circumstances, the attitude error Xt can be estimated with the disturbance from the environment minimized. As a result, even under such circumstances, the attitude error Xt should be able to converge to a true value, which is an effect to be achieved by this embodiment. It should be noted that any kind of buttons may be used in any numbers. Thus, if a larger number of buttons are used and if mutually different degrees of reliability are allocated to those buttons, the attitude error Xt can be estimated more finely. In that case, the operator can have an option for getting the attitude error Xt converged more quickly. Consequently, the tracking performance can be improved.

As can be seen from the foregoing description, according to this embodiment of the present disclosure, by changing the degree of reliability (i.e., the covariance matrix Rt of the measured value of the solar positional shift Yt) in accordance with the decision made by the operator from his or her experience, the estimated attitude error Xt can be converged to a true value efficiently.

Embodiment 3

A third embodiment of the present disclosure is characterized by the dither control section 7, which operates differently from its counterpart of the first and second embodiments described above. Specifically, according to the first and second embodiments described above, the range of the dither operation is supposed to be constant. However, if the range of the dither operation were more than necessarily broad, it would take a longer time to get the dither operation done and eventually estimate the attitude error Xt. On the other hand, according to this third embodiment, the dither operation can get done in a shorter time.

According to this embodiment, in the process of updating the estimated attitude error Xt, a covariance matrix Rt indicating its degree of reliability is obtained to find its degree of reliability. And the solar position measuring section predicts the solar positional shift and determines the range of the dither operation based on that degree of reliability. As a result, the range of the dither operation can be limited to an appropriate size.

The solar position measuring section can predict the solar positional shift based on the degree of reliability by the following Equation (4):

$$\begin{bmatrix} \theta_E \\ \phi_E \end{bmatrix} = \min\_\max\{h_t(x) : |^\forall x - x_t| < n\sqrt{\text{diag}(P_t)}\} \quad (4)$$

In Equation (4), the function diag is used to make a column vector by extracting the diagonal element from the covariance matrix Rt of the attitude error Xt. By calculating the square of the function diag, the standard deviations of the respective components (pitch, roll, yaw) of the attitude error Xt can be obtained. Although the square of the function diag multiplied by n is used in Equation (4), n may generally be set to be three, which corresponds to ±3σ on the supposition that there is a normal distribution (i.e., the probability at which the random variable falls in that range is 99.73%).

Also, |X−Xt| in Equation (4) means calculating the absolute value of the respective elements, not the norm of the vector. That is to say, this means that the respective elements of the attitude error X are not three or more times distant from the standard deviation with respect to Xt.

By applying the function ht to such a set of attitude errors X, a set of expected solar positional shifts can be obtained. And by applying the function min_max for calculating the width of the difference between the maximum and minimum values of the set of attitude errors Xt, the dispersion width θE of the solar positional shifts in the elevation angle direction and the dispersion width φE of the solar positional shifts in the azimuth angle direction can be obtained. By setting the range of the dither operation to be equal to θE and φE, the time it takes to get the dither operation done can be minimized and the attitude error Xt can be estimated efficiently as a result.

Next, the simulation experiments that the present inventors carried out to demonstrate the effects of this embodiment will be described. When the simulation experiments were carried out, the initial value of the diagonal element of the covariance matrix Rt of the attitude error Xt represented by Equation (4) was set to be (0.6 degrees)2, while the diagonal element of the covariance matrix Rt of the measured value of the solar positional shift Yt was set to be (0.3 degrees)2. The measurements and estimations were carried out eleven times at an interval of one hour from September 1, 7:00 am.

Figure 13:
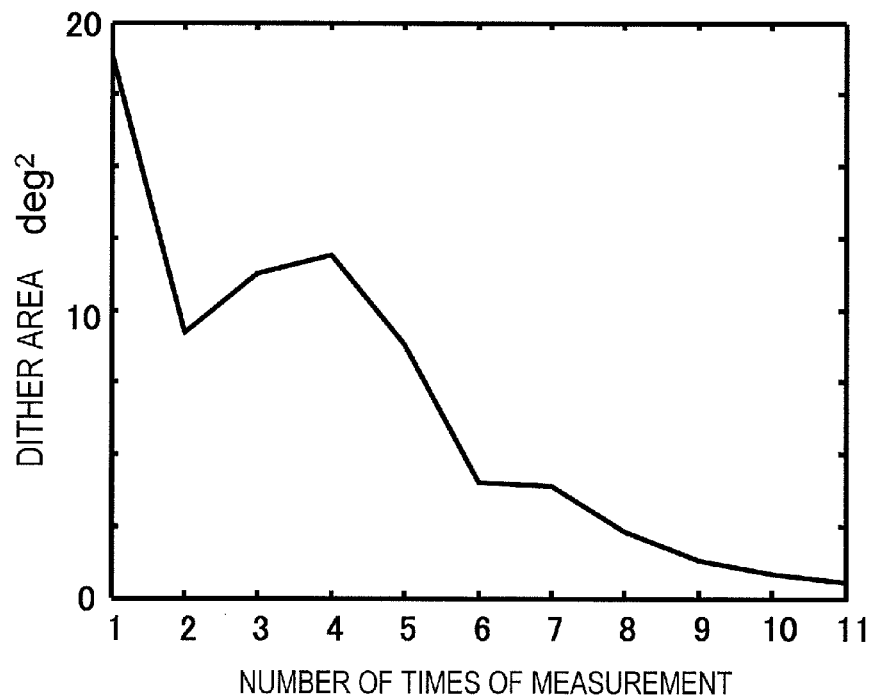
FIG. 13 is a graph showing the results of simulations which are carried out to reduce the dither area according to a third embodiment of the present disclosure.

The results of those simulation experiments are shown in FIG. 13, which shows how the area indicating the range of the dither operation (by the squared degrees) changed with the number of times of measurements. Such an area indicating the range of the dither operation will be referred to herein as a "dither area". The dither area is defined as the product of θE and φE in Equation (4).

As can be seen from FIG. 13, when the measurement was carried out for the first time, a wide range, of which the dither area was approximately equal to the square of 20 degrees, had to be scanned. If this range has a square shape, each side thereof will be approximately 4.5 degrees. However, the larger the number of times of measurement, the more significantly the dither area decreased. Consequently, it can be seen that if the range of the dither operation is determined by using the covariance matrix Rt of the attitude error Xt (i.e., the degree of reliability of the attitude error), the dither area can be reduced effectively, and eventually the measurement can get done in a shorter time.

Optionally, the points of measurement of the dither operation may be set more densely by making the step of displacement of the azimuth and elevation angles in the dither operation narrower than the permissible angle of incidence to be determined by the angle dependence of the solar panel 110 with respect to the incident light.

Figure 14:
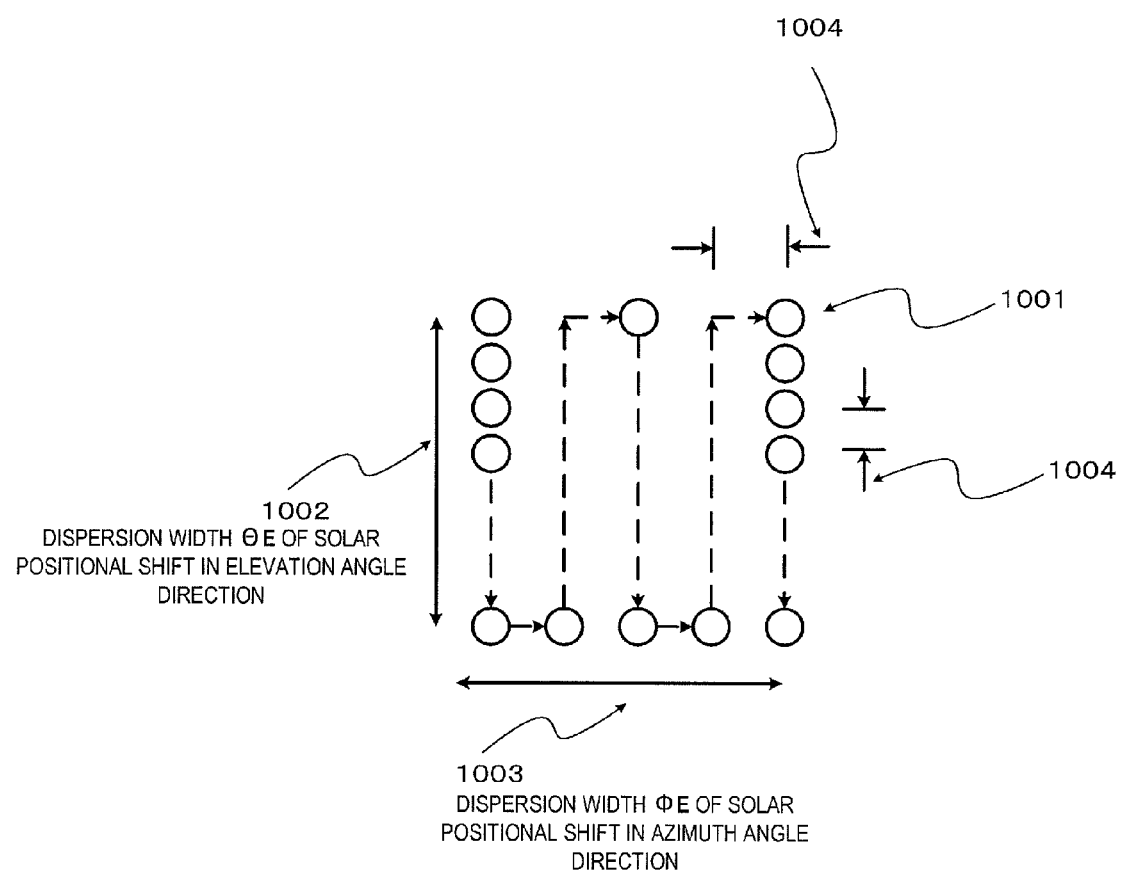
FIG. 14 illustrates the third embodiment of the present disclosure.

Next, the correlation between θE, φE and an exemplary pattern of the dither operation will be described with reference to FIG. 14.

Circular points 1001 indicate the positions where the quantities of the electric power generated are measured by the quantity of power generated measuring section 5 during the dither operation. The gap 1004 between the circular points 1001 corresponds to the dither interval. The width 1002 indicates the dispersion width θE of the solar positional shift in the elevation angle direction. And the width 1003 indicates the dispersion width φE of the solar positional shift in the azimuth angle direction. The dither advancement direction is indicated by the dotted arrow.

If the time it takes to get the dither operation done and the time it takes to estimate the attitude error Xt need to be shortened, the number of dither points, i.e., the number of the positions where the quantities of the electric power generated are measured by the quantity of power generated measuring section 5 during the dither operation, may be reduced. If the range of the dither operation has been determined in advance, the dither interval 1004 may be widened. However, if the dither interval 1004 were too wide, the direction in which the solar panel 110 receives the sunlight may be missed.

According to this embodiment, the permissible angle of incidence to be determined by the angle dependence of the photovoltaic generator module with respect to the incident light is measured in advance, and the dither interval 1004 is set so as not to exceed this permissible angle of incidence. As a result, the dither operation can get done in a shorter time and the solar positional shift can be measured efficiently without losing track of the solar position. As can be seen, according to this embodiment, the time it takes to estimate the attitude error Xt can be shortened by adjusting the range and method of the dither operation.

A solar power generator the present disclosure includes: either an arbitrary solar tracker according to any of the embodiments described above or a solar tracker, of which the configuration is a combination of those embodiments described above; and a solar panel which is supported by the supporting mechanism of the solar tracker. Any solar panel may be used as long as the solar panel includes a concentrating photovoltaic generator module which generates electric power using the sunlight received. Nevertheless, the higher the degree of concentrating the incoming sunlight, the smaller the measurement error of the solar position obtained by the dither operation, which is advantageous.

By adopting the solar power generator of the present disclosure, even if the altitude of the sun is relatively low, the sunlight can still be converted into electrical energy without causing a significant decrease in the efficiency, because the solar panel is oriented so as to track the sun.

A controller for use in the solar tracker of the present disclosure includes: a control section which changes the orientation of the solar panel so that a normal to a solar collector plane of the solar panel tracks the sun; a dither control section which performs a dither operation by changing the orientation of the solar panel so that the normal to a solar collector plane of the solar panel scans a predetermined range to be determined by the theoretical solar position [$\varphi 1$, $\theta 1$]; a positional shift measuring section which measures the value of the solar positional shift ($\Delta \varphi m$, $\Delta \theta m$) between the measured solar position to be determined based on the distribution of the quantities of electric power generated by the solar panel that have been measured during the dither operation and the theoretical solar position; and an attitude error estimating section which gets an estimated attitude error Xt (=[roll, pitch, yaw]) of the supporting mechanism based on the measured value of the solar positional shift Yt and which updates the estimated attitude error Xt based on the degree of reliability Rt of the measured value of the solar positional shift Yt and the degree of reliability Pt of the attitude error (Xt→Xt+1). And the control section corrects the theoretical solar position based on the estimated attitude error Xt+1 that has been updated and controls the orientation of the solar panel based on the theoretical position corrected.

A program for controlling a solar tracker according to the present disclosure is configured to make the solar tracker perform the steps of: getting information about the theoretical solar position at an arbitrary point in time; performing a dither operation by changing the orientation of the solar panel so that a normal to the solar collector plane of the solar panel, including a concentrating photovoltaic generator module which generates electric power using sunlight received, scans a predetermined range to be determined by the theoretical solar position; measuring the quantity of electric power generated by the solar panel during the dither operation, determining the measured solar position based on the distribution of the quantities of electric power generated that have been measured, and measuring the value of the solar positional shift between the measured solar position that has been determined and the theoretical solar position; and getting an estimated attitude error of the supporting mechanism based on the measured value of the solar positional shift and updating the estimated attitude error based on the respective degrees of reliability of the measured value of the solar positional shift and the attitude error. Such a program may be stored in a semiconductor storage device or any other kind of memory.

It should be noted that the operation of estimating the attitude error of the supporting mechanism according to the present disclosure may be performed when or after the solar power generator is/has been installed by fixing the supporting mechanism on the base. Also, since the correction value for compensating for the attitude error is already known once the attitude error has been estimated properly, there is no need to perform the operation of estimating the attitude error as long as the attitude error can be kept constant. However, if the attitude error of the supporting mechanism has changed due to a strong wind or earthquake, it is recommended that the attitude error be estimated again. The operation of estimating the attitude error may be performed at irregular intervals in accordance with instructions of an operator, automatically at predetermined intervals, or even in combination of these two methods.

An embodiment of a solar power generator according to the present disclosure does not have to use, on the spot, part or all of the electric power generated based on the sunlight received. Alternatively, part or all of that electric power generated may be either stored in a built-in or portable storage cell or an electric car or plug-in hybrid car's storage cell or even sold to some person.

A solar tracker according to the present disclosure can be used effectively as a solar tracker for a solar panel equipped with concentrating photovoltaic generator modules. Also, a solar power generator including such a solar tracker can always generate electric power efficiently based on the sunlight received, irrespective of the altitude of the sun.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A solar tracker comprising:
    a supporting mechanism configured to support a solar panel so as to change an orientation of the solar panel, the solar panel including a concentrating photovoltaic generator module which generates electric power using sunlight received;
    a measuring section which measures a quantity of electric power generated by the solar panel;
    a solar position getting section which gets information about a theoretical solar position at an arbitrary point in time defined by azimuth and elevation angles;
    a driving section which changes an orientation of the solar panel so that a normal to a solar collector plane of the solar panel tracks the sun;
    a dither control section which is connected to the driving section and which performs a dither operation by changing the orientation of the solar panel so that the normal to the solar panel scans a predetermined range determined to include the theoretical solar position obtained by the solar position getting section;

a positional shift measuring section which measures a measured value of a solar positional shift between a measured solar position to be determined based on a distribution of quantities of electric power generated by the solar panel that have been measured by the measuring section during the dither operation and the theoretical solar position; and an attitude error estimating section which gets an estimated attitude error of the supporting mechanism based on the measured value of the solar positional shift and which updates the estimated attitude error based on a respective degree of reliability of the measured value of the solar positional shift and the estimated attitude error, the estimated attitude error being defined by rotations of three-dimensional orthogonal coordinates of the supporting mechanism with respect to reference three-dimensional orthogonal coordinates, wherein the driving section corrects the theoretical solar position based on the estimated attitude error that has been updated and controls the orientation of the solar panel based on the theoretical position corrected, and the degree of reliability of the measured value is determined based on the distribution of the quantities of electric power generated by the solar panel that have been measured.

2. The solar tracker of claim 1, wherein the degree of reliability of the measured value is determined by comparing at least one of a peak value and peak width of the distribution of the quantities of electric power generated by the solar panel that have been measured to at least one of a peak value and peak width of a distribution of quantities of electric power to be generated by the solar panel in an area and period in which the solar panel is installed.

3. The solar tracker of claim 2, wherein the degree of reliability of the measured value is determined by comparing the peak value of the distribution of the quantities of electric power generated by the solar panel that have been measured to the peak value of the distribution of the quantities of electric power to be generated by the solar panel in an area and period in which the solar panel is installed.

4. The solar tracker of claim 2, wherein the degree of reliability of the measured value is determined by comparing the peak width of the distribution of the quantities of electric power generated by the solar panel that have been measured to the peak width of the distribution of the quantities of electric power to be generated by the solar panel which is calculated based on an angle dependence of the photovoltaic generator module with respect to incident light.

5. The solar tracker of claim 1, wherein the degree of reliability of the measured value is determined by a wind velocity.

6. The solar tracker of claim 5, wherein the solar tracker stores information indicating a critical value of a wind velocity to be determined by a wind resistance of the solar tracker, and
    if the wind velocity exceeds the critical value, the degree of reliability of the measured value is decreased.

7. The solar tracker of claim 1, further comprising an operating section which is configured to allow a person who operates the solar tracker to set the degree of reliability of the measured value.

8. The solar tracker of claim 7, wherein the operating section has a plurality of buttons, to which different degrees of reliability have been allocated in advance with respect to the measured value, and the estimated attitude error is updated based on the degree of reliability that has been selected by pushing the buttons.

9. The solar tracker of claim 1, wherein the dither control section determines the range of the dither operation based on the degree of reliability of the attitude error.

10. The solar tracker of claim 1, wherein the dither control section sets a point of measurement for the dither operation within a range which is narrower than a range of a permissible angle of incidence to be determined by an angle dependence of the photovoltaic generator module with respect to the incident light.

11. A solar power generator comprising:
    the solar tracker of claim 1; and
    a solar panel which is supported by the supporting mechanism of the solar tracker.

12. A controller for use in the solar tracker of claim 1, the controller comprising:
    a driving section which changes an orientation of a solar panel so that a normal to a solar collector plane of the solar panel tracks the sun;
    a dither control section which is connected to the driving section and which performs a dither operation by changing the orientation of the solar panel so that the normal to the solar panel scans a predetermined range to be determined by a theoretical solar position;
    a positional shift measuring section which measures a value of the solar positional shift between a measured solar position to be determined based on the distribution of the quantities of electric power generated by the solar panel that have been measured by the measuring section during the dither operation and the theoretical solar position; and
    an attitude error estimating section which gets an estimated attitude error of the supporting mechanism based on the measured value of the solar positional shift and which updates the estimated attitude error based on the respective degrees of reliability of the measured value of the solar positional shift and the attitude error,
    wherein the driving section corrects the theoretical solar position based on the estimated attitude error that has been updated and controls the orientation of the solar panel based on the theoretical position corrected.

13. A method for estimating the attitude error of a solar tracker, the method comprising the steps of:
    setting up a supporting mechanism on a base, the supporting mechanism supporting a solar panel, including a concentrating photovoltaic generator module which generates electric power using sunlight received, so as to change an orientation of the solar panel;
    getting information about a theoretical solar position at an arbitrary point in time defined by azimuth and elevation angles;
    performing a dither operation by changing the orientation of the solar panel so that a normal to the solar panel scans a predetermined range determined to include the theoretical solar position;
    measuring a quantity of electric power generated by the solar panel during the dither operation, determining a measured solar position based on a distribution of quantities of electric power generated that have been measured, and measuring a value of a solar positional shift between the measured solar position that has been determined and the theoretical solar position; and
    getting an estimated attitude error of the supporting mechanism based on the measured value of the solar positional shift and updating the estimated attitude error based on a respective degree of reliability of the measured value of the solar positional shift and the estimated attitude error, the estimated attitude error being defined by rotations of three-dimensional orthogonal coordinates of the supporting mechanism with respect to reference three-dimensional orthogonal coordinates.

14. A sun-tracking method comprising the step of correcting a theoretical solar position based on an estimated attitude error that has been updated and obtained by the method of claim 13 and controlling the orientation of the solar panel based on the theoretical position corrected.

15. A program stored in a non-transitory computer-readable recording medium executed by a computer for controlling a solar tracker, the program being configured to make the solar tracker perform the steps of:

getting information about a theoretical solar position at an arbitrary point in time defined by azimuth and elevation angles;

performing a dither operation by changing an orientation of a solar panel so that a normal to a solar collector plane of the solar panel, including a concentrating photovoltaic generator module which generates electric power using sunlight received, scans a predetermined range determined to include the theoretical solar position;

measuring a quantity of electric power generated by the solar panel during the dither operation, determining a measured solar position based on a distribution of quantities of electric power generated that have been measured, and measuring a value of the solar positional shift between a measured solar position that has been determined and the theoretical solar position; and getting an estimated attitude error of the supporting mechanism based on the measured value of the solar positional shift and updating the estimated attitude error based on a respective degree of reliability of the measured value of the solar positional shift and the estimated attitude error, the estimated attitude error being defined by rotations of three-dimensional orthogonal coordinates of the supporting mechanism with respect to reference three-dimensional orthogonal coordinates.

* * * * *